United States Patent
Cheon

(10) Patent No.: US 12,161,285 B2
(45) Date of Patent: Dec. 10, 2024

(54) ROBOT CLEANER USING ARTIFICIAL INTELLIGENCE AND CONTROL METHOD THEREOF

(71) Applicant: LG ELECTRONICS INC., Seoul (KR)

(72) Inventor: Sunhee Cheon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 434 days.

(21) Appl. No.: 17/599,025

(22) PCT Filed: Mar. 26, 2020

(86) PCT No.: PCT/KR2020/004124
§ 371 (c)(1),
(2) Date: Sep. 28, 2021

(87) PCT Pub. No.: WO2020/204465
PCT Pub. Date: Oct. 8, 2020

(65) Prior Publication Data
US 2022/0175208 A1  Jun. 9, 2022

(30) Foreign Application Priority Data
Mar. 29, 2019 (KR) .......... 10-2019-0037202

(51) Int. Cl.
*A47L 9/28* (2006.01)
*A47L 9/00* (2006.01)
*G05D 1/00* (2024.01)

(52) U.S. Cl.
CPC .......... *A47L 9/2852* (2013.01); *A47L 9/009* (2013.01); *A47L 9/2805* (2013.01);
(Continued)

(58) Field of Classification Search
CPC .......... A47L 11/4011; A47L 2201/04; A47L 2201/06; A47L 9/009; A47L 9/2805;
(Continued)

(56) References Cited

U.S. PATENT DOCUMENTS

2006/0195224 A1  8/2006  Song et al.
2012/0125363 A1*  5/2012  Kim ............. A47L 9/2847
                                              134/6
(Continued)

FOREIGN PATENT DOCUMENTS

KR  10-0657527  12/2006
KR  10-2008-0090925  10/2008
KR  10-2016-0100950  8/2016

OTHER PUBLICATIONS

KR20160100950A machine translation (Year: 2016).*
International Search Report dated Aug. 25, 2020 issued in Application No. PCT/KR2020/004124.

*Primary Examiner* — Douglas Lee
(74) *Attorney, Agent, or Firm* — KED & Associates LLP

(57) ABSTRACT

A robot cleaner of the present disclosure includes: a traveling unit configured to move a main body; a cleaning unit configured to perform a cleaning function; a sensing unit configured to detect a surrounding environment; and a controller configured to perform a previous cleaning, to map a cleaning zone based on information detected by the sensing unit, and to control to perform cleaning by matching different cleaning methods according to a shape of the mapped cleaning zone. Accordingly, it is possible to increase the efficiency by providing an accurate cleaning zone definition and the division of the cleaning zone, and by providing an optimum cleaning traveling mode according to the divided cleaning zone.

17 Claims, 18 Drawing Sheets

(52) U.S. Cl.
CPC ......... *G05D 1/0214* (2013.01); *G05D 1/0274* (2013.01); *A47L 2201/04* (2013.01)

(58) Field of Classification Search
CPC .. A47L 9/2852; G05D 1/0214; G05D 1/0219; G05D 1/0274
See application file for complete search history.

(56) References Cited

U.S. PATENT DOCUMENTS

| | | | |
|---|---|---|---|
| 2014/0075689 A1* | 3/2014 | Windorfer | A47L 9/0488 15/21.1 |
| 2016/0302638 A1* | 10/2016 | Haegermarck | G05D 1/0248 |
| 2018/0074508 A1 | 3/2018 | Kleiner et al. | |
| 2019/0025851 A1 | 1/2019 | Ebrahimi Afrouzi | |

* cited by examiner

[Fig. 1]
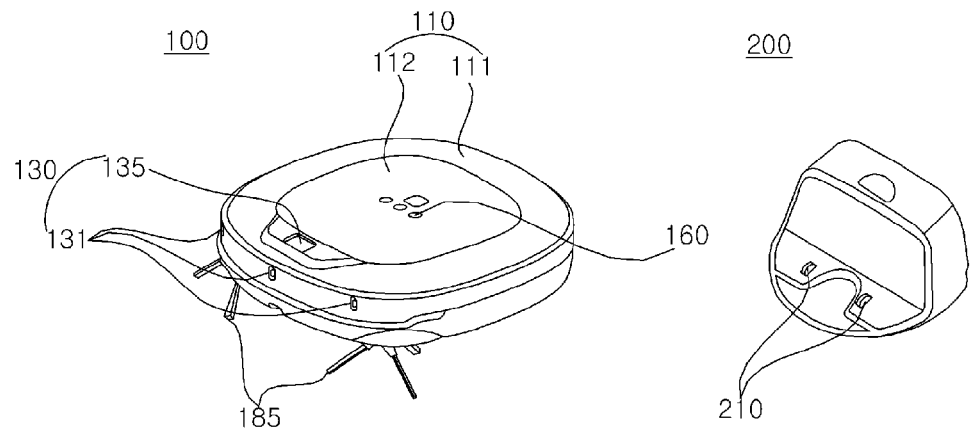
[Fig. 2]
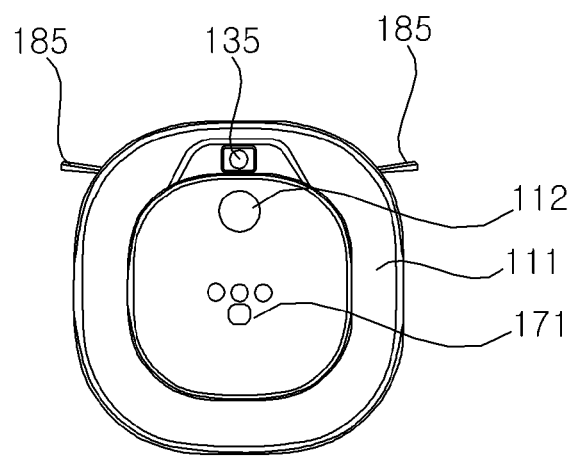

[Fig. 3]
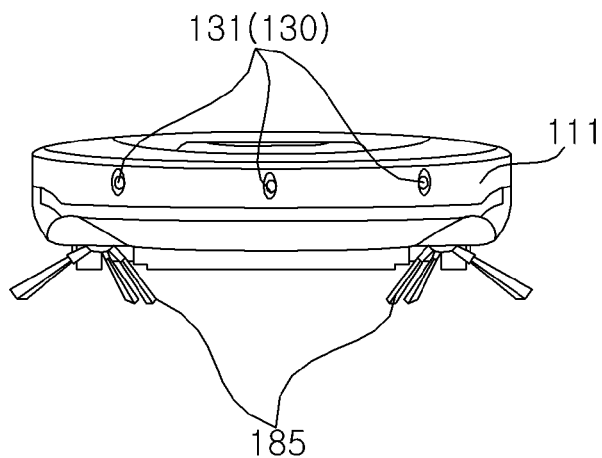
[Fig. 4]
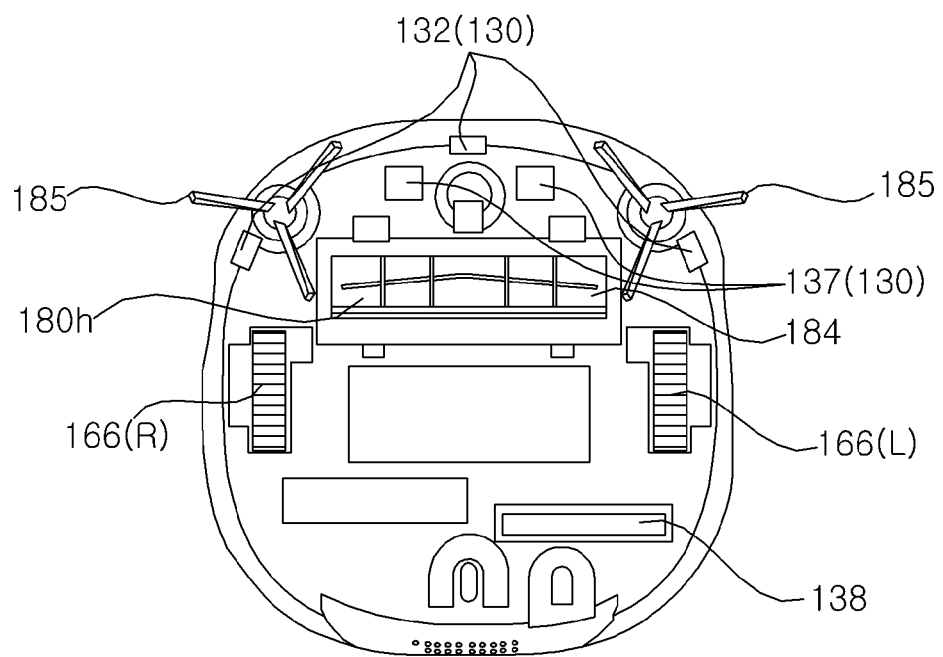

[Fig. 5]
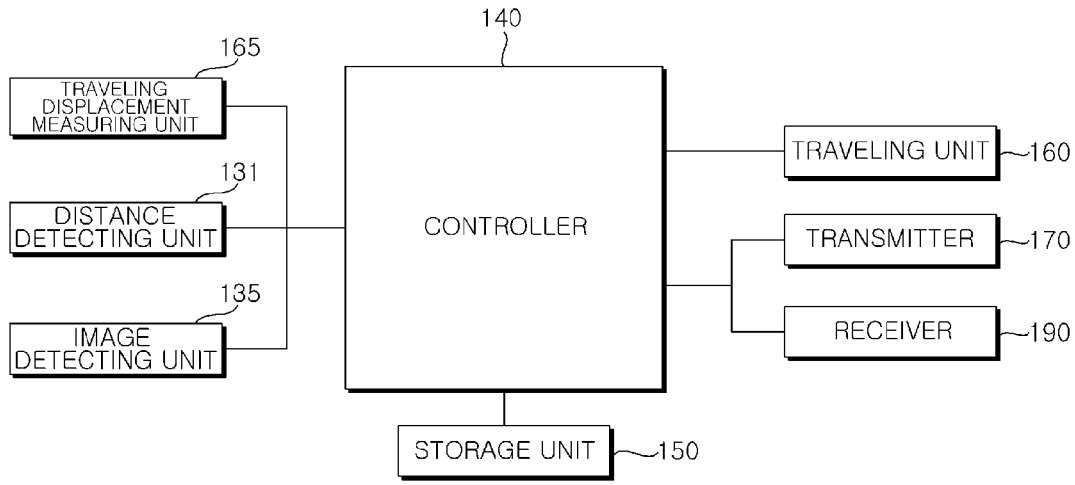
[Fig. 6]
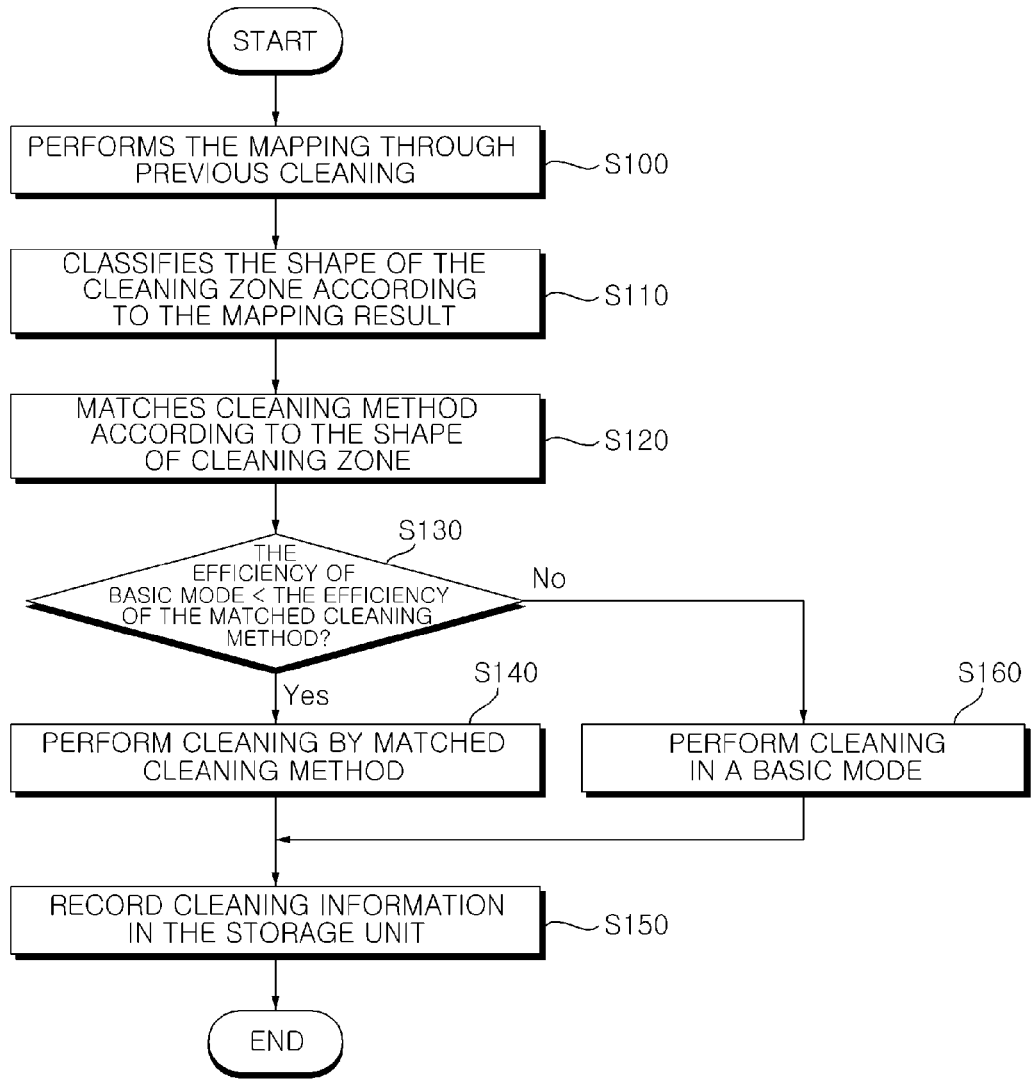

[Fig. 7]
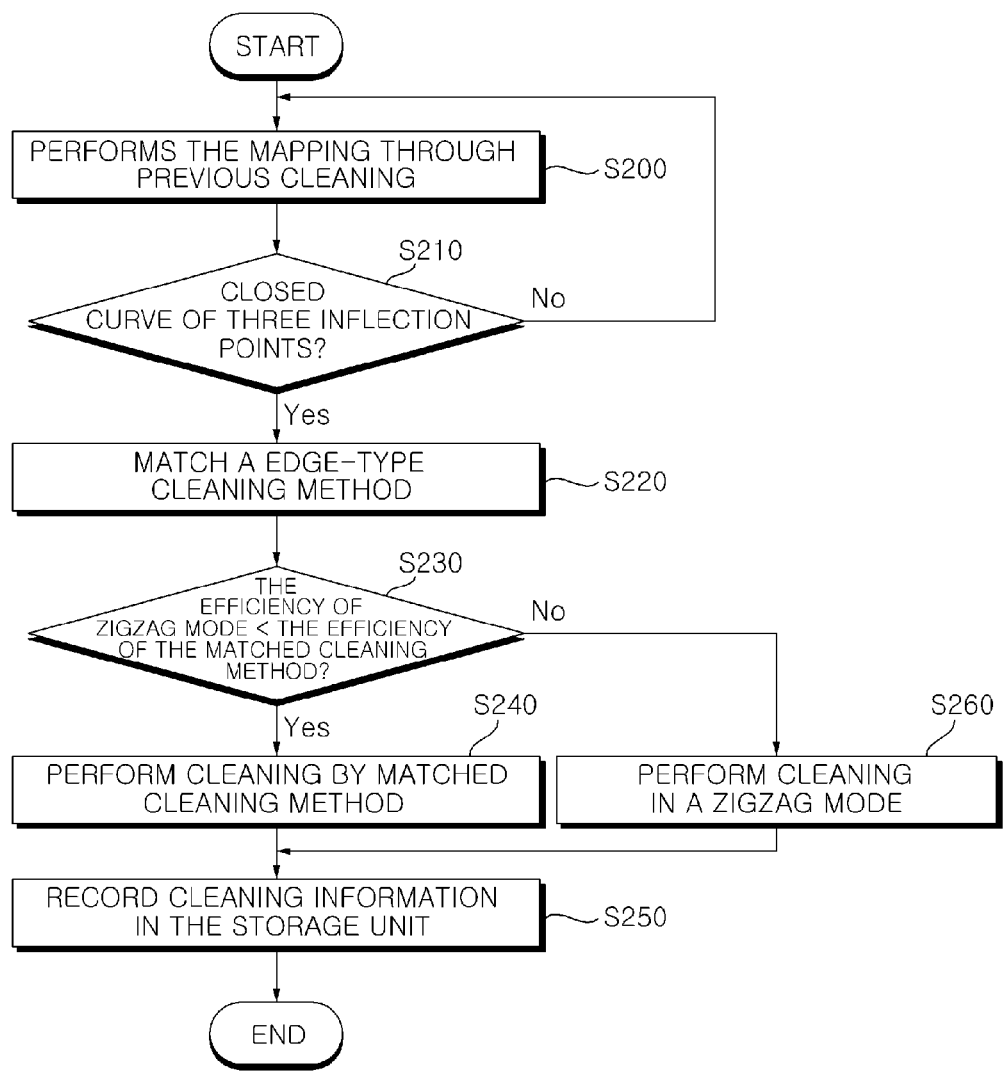

[Fig. 8A]
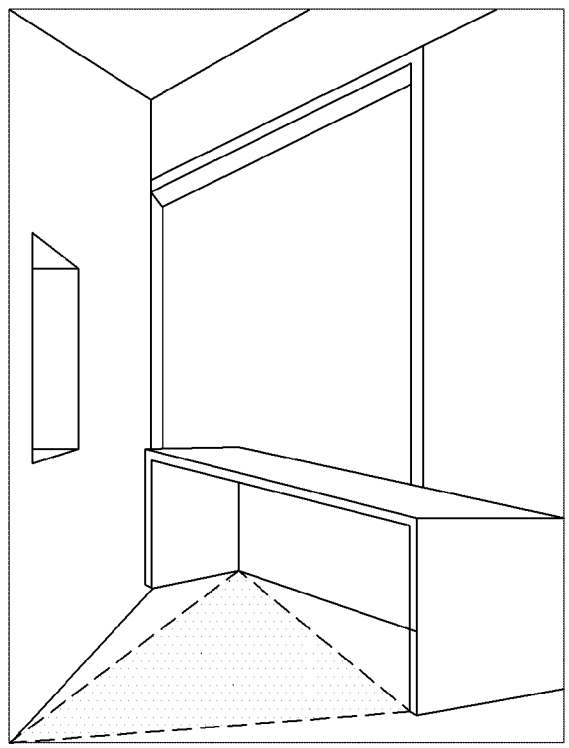
[Fig. 8B]
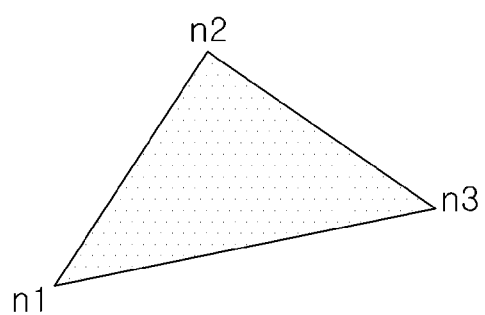
[Fig. 8C]
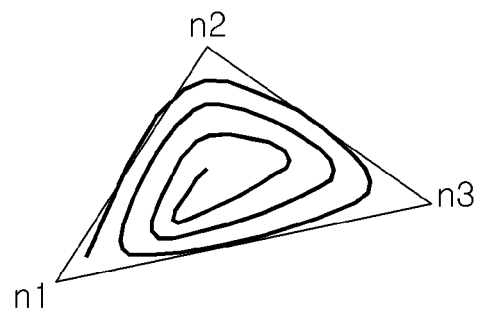

[Fig. 8D]
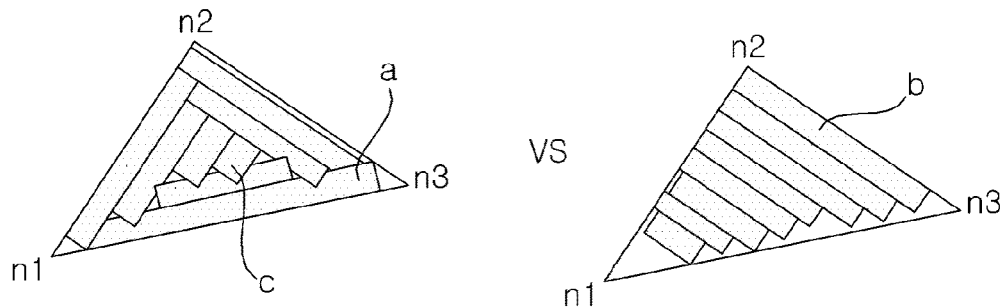
[Fig. 9]
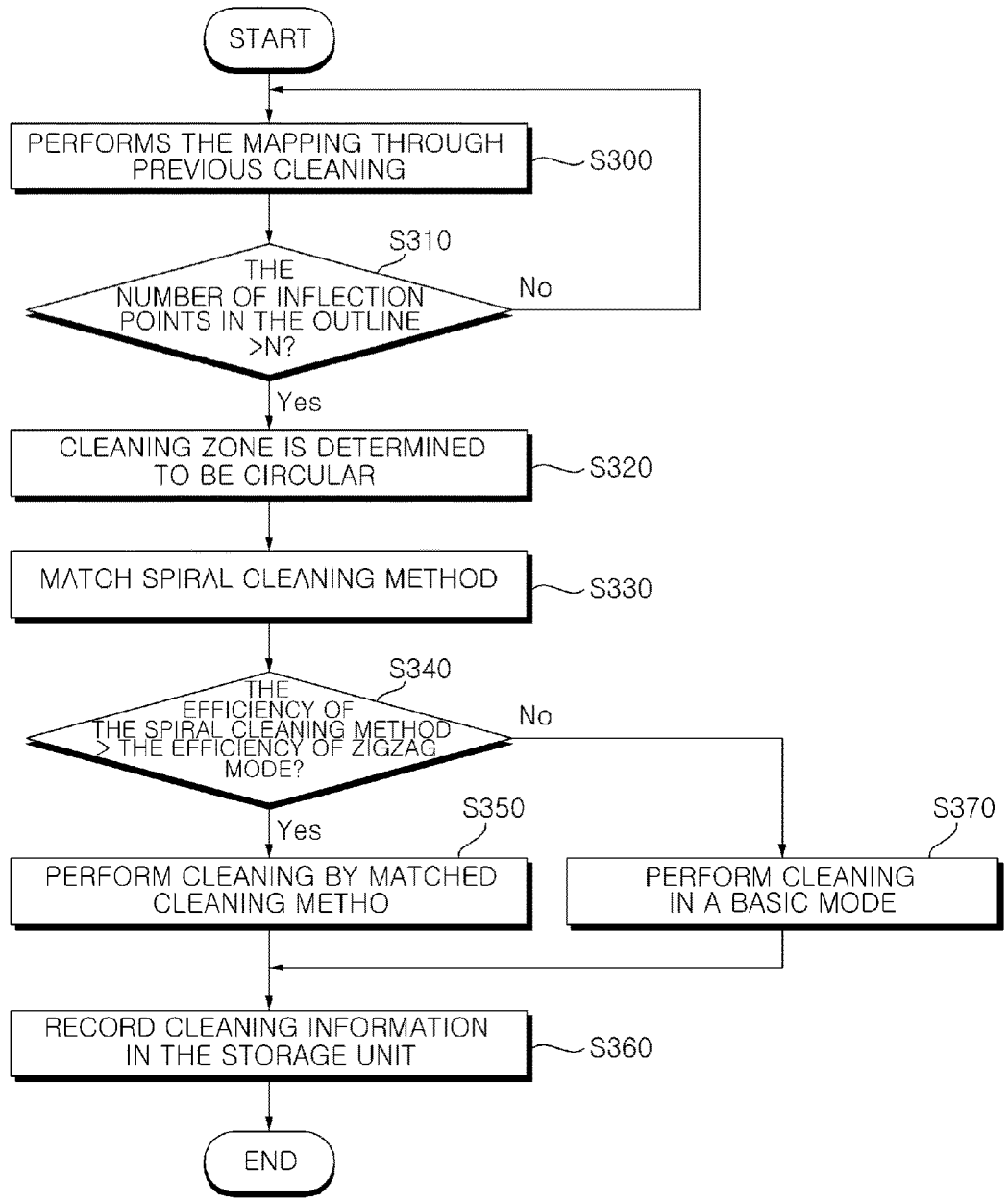

[Fig. 10A]
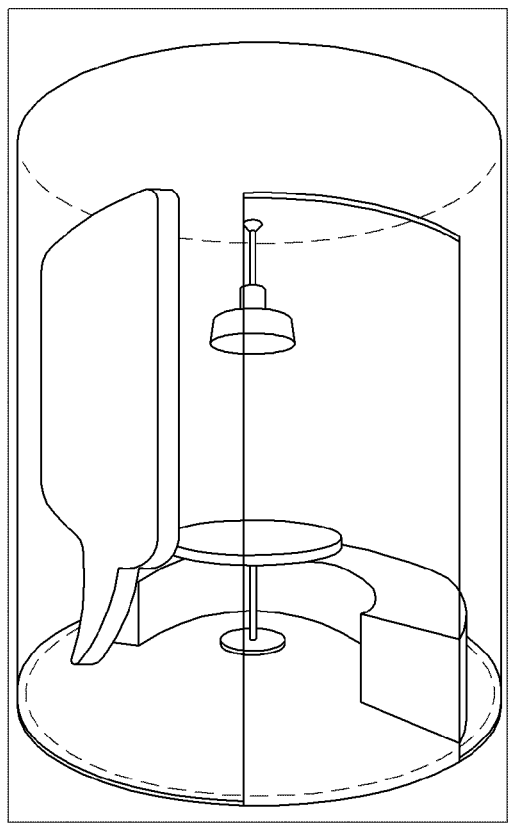
[Fig. 10B]
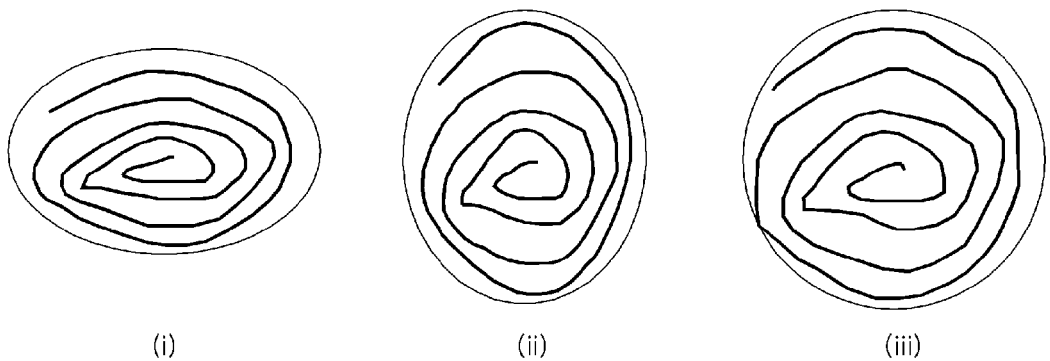
(i)            (ii)            (iii)

[Fig. 10C]
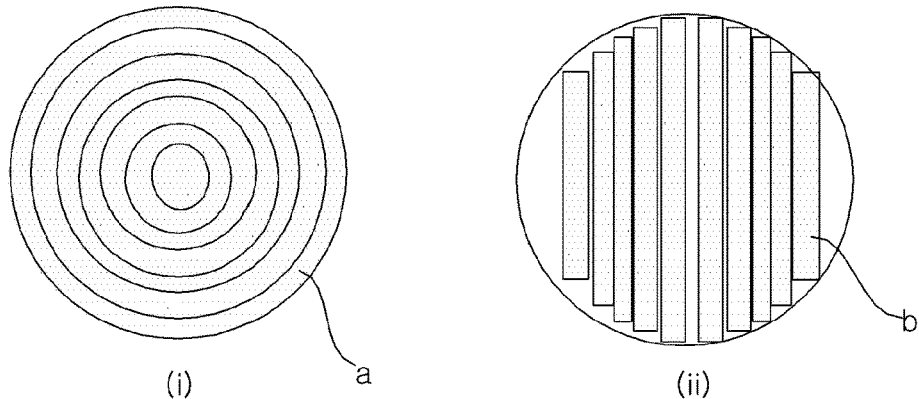
[Fig. 11]
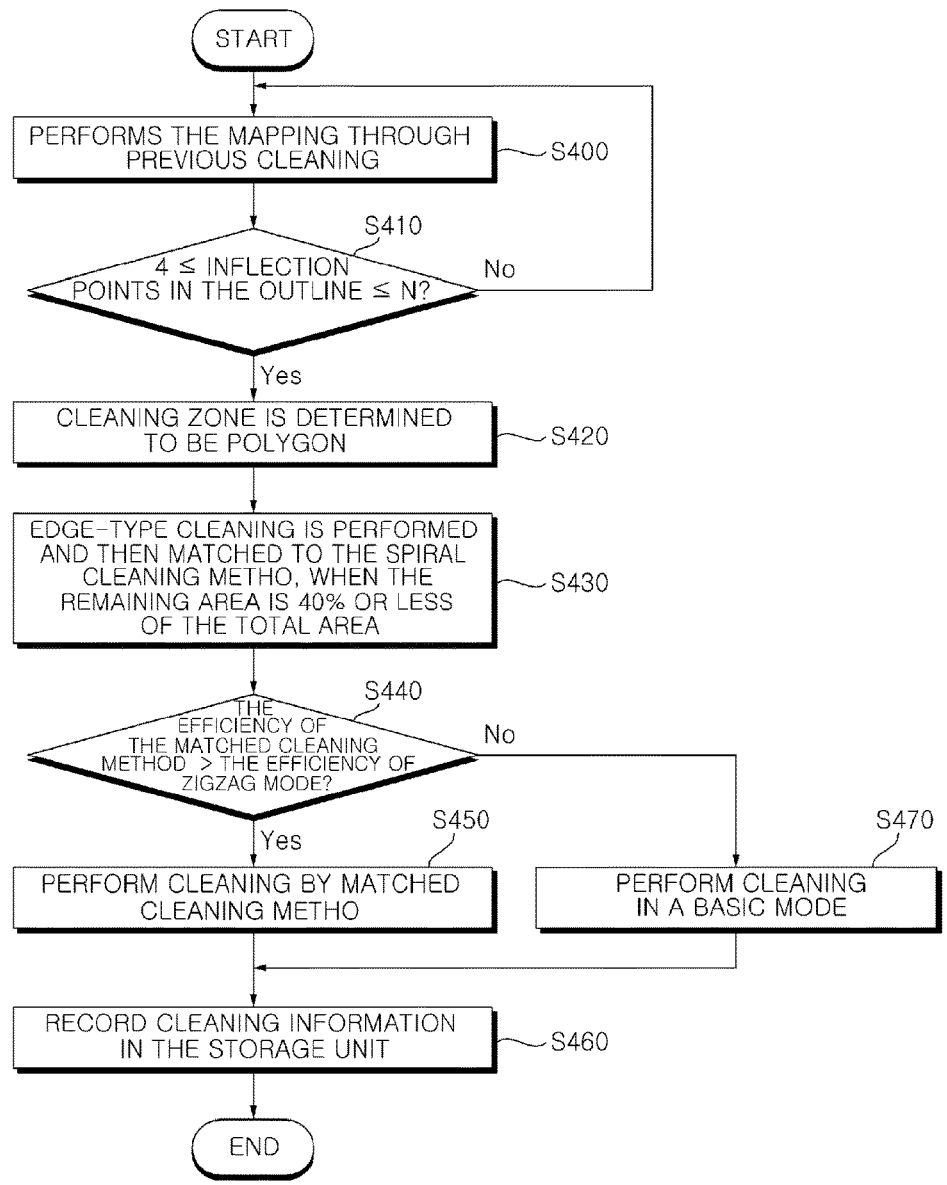

[Fig. 12A]
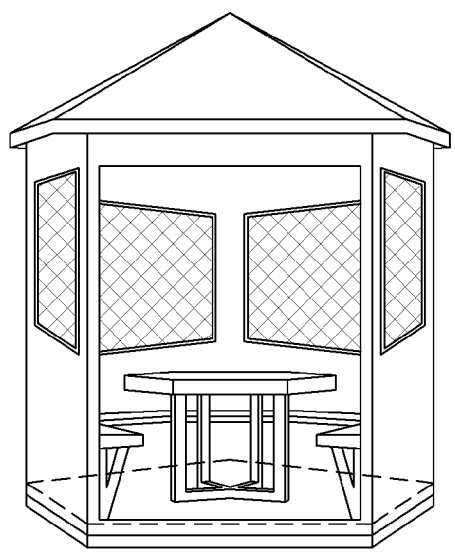
[Fig. 12B]
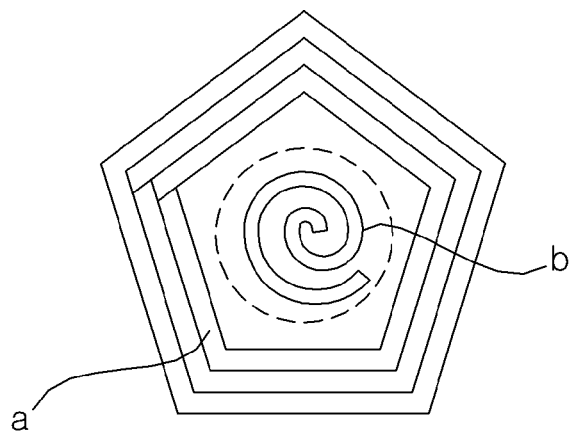

[Fig. 13]
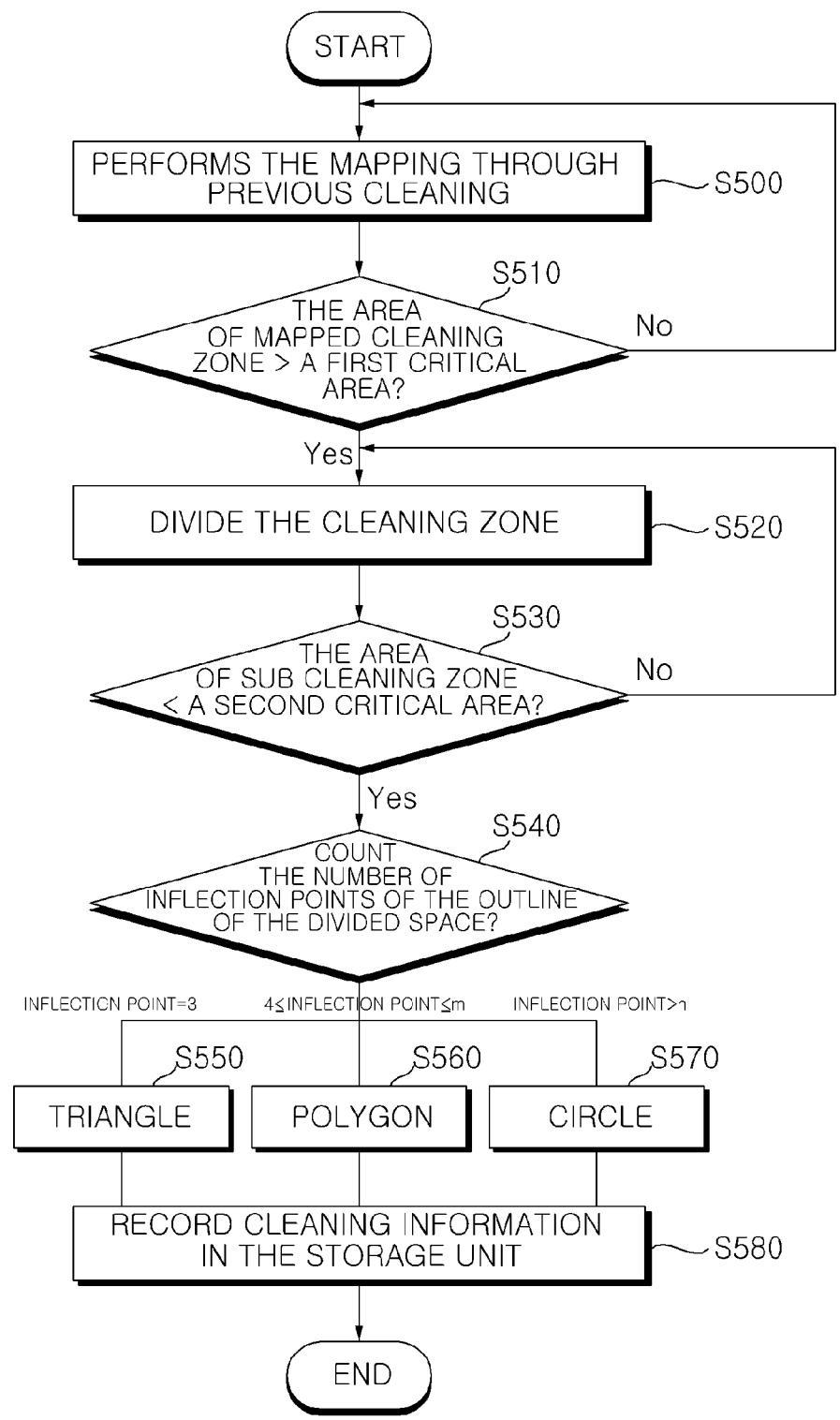

[Fig. 14]
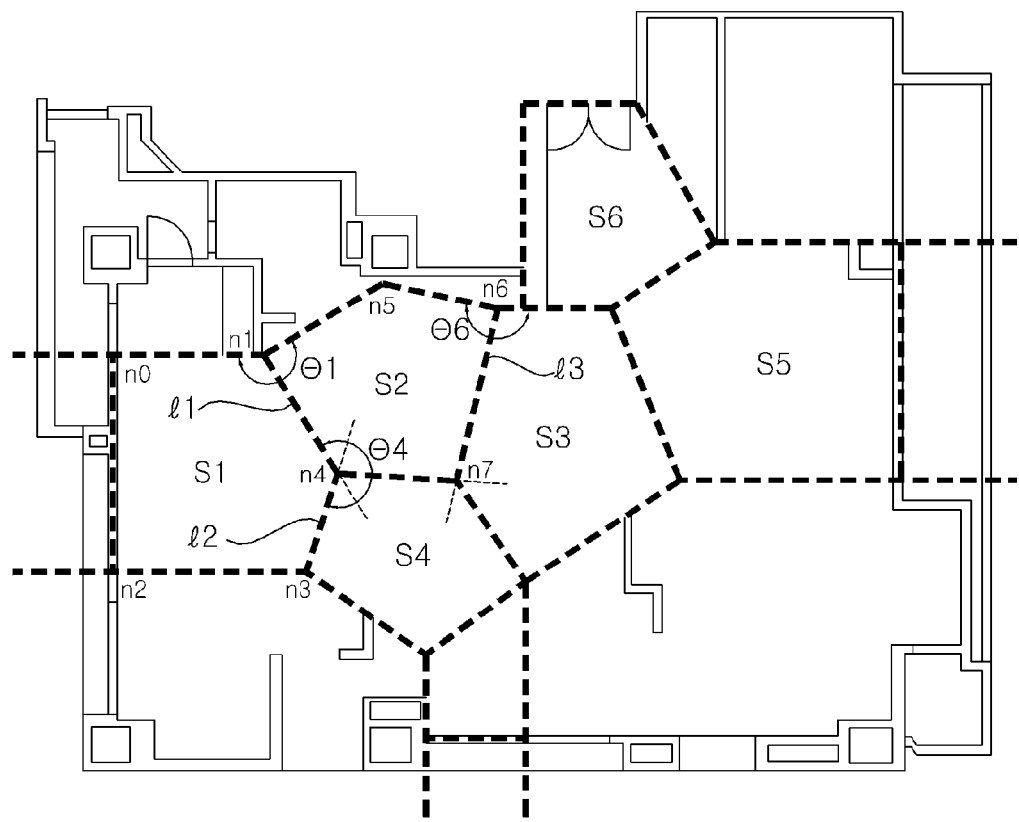

[Fig. 15]
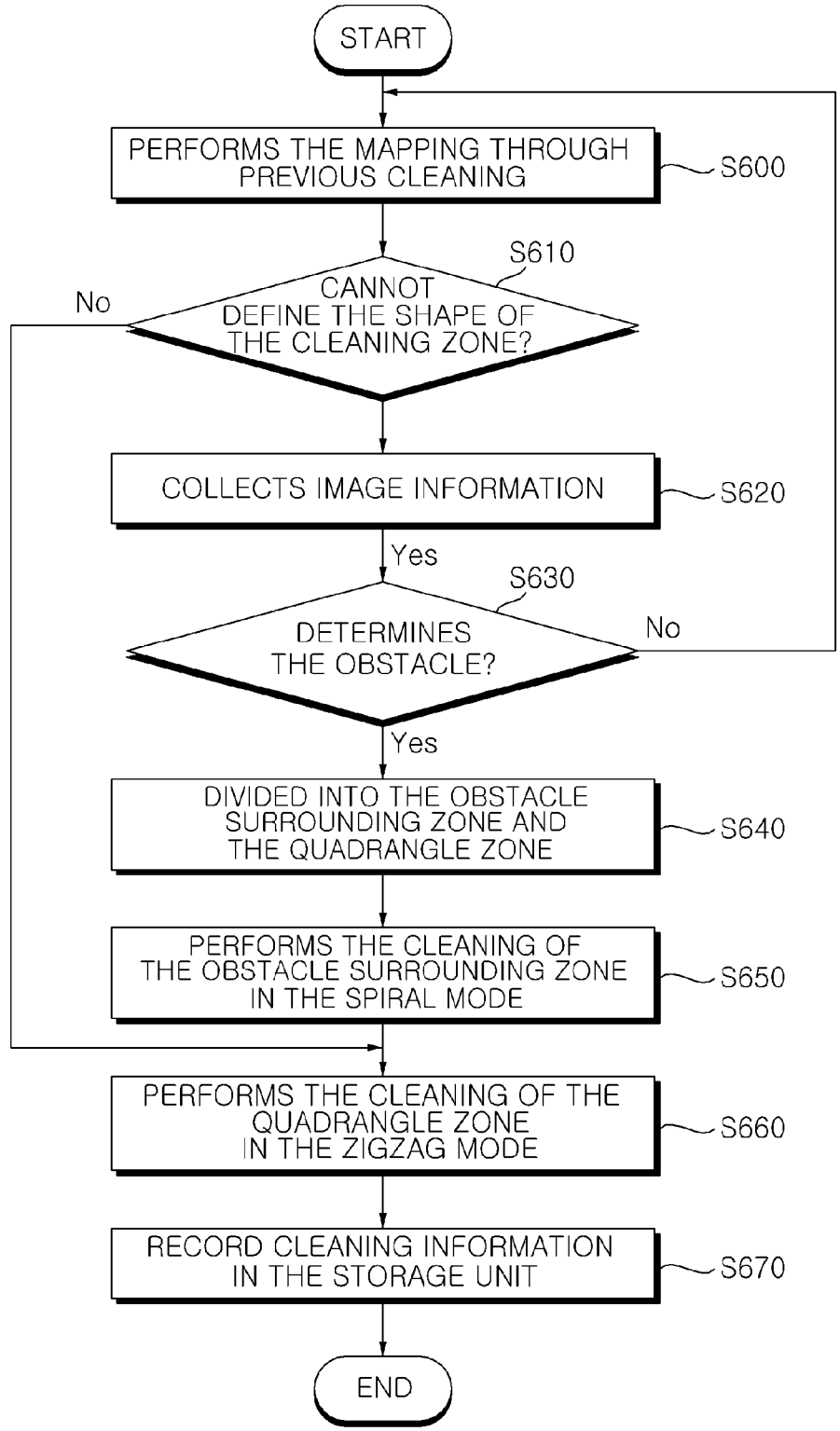

[Fig. 16A]
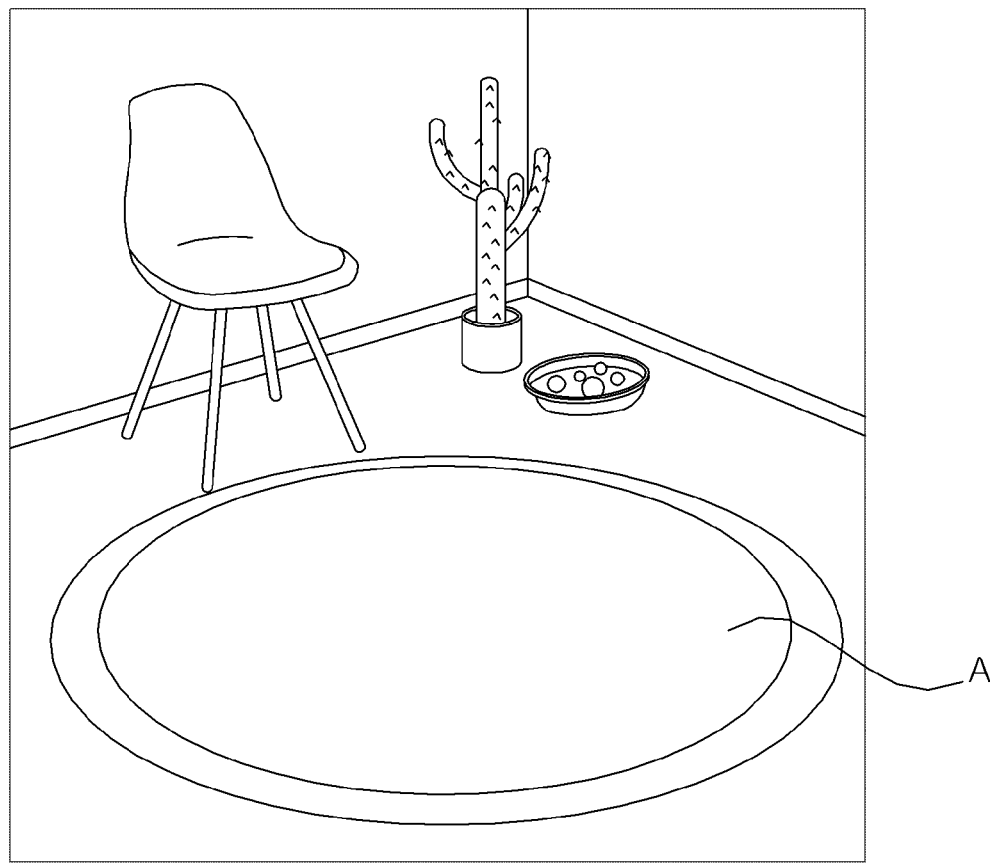
[Fig. 16B]
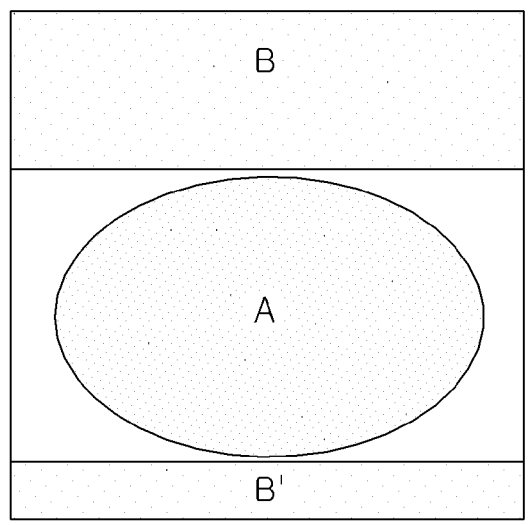

[Fig. 16C]
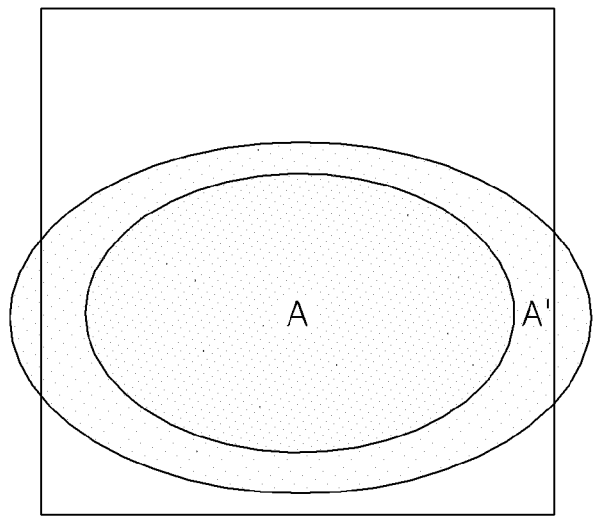
[Fig. 16D]
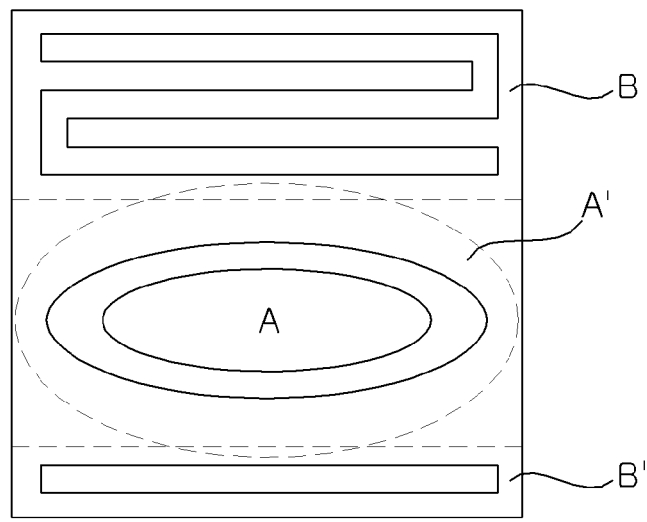

[Fig. 17]
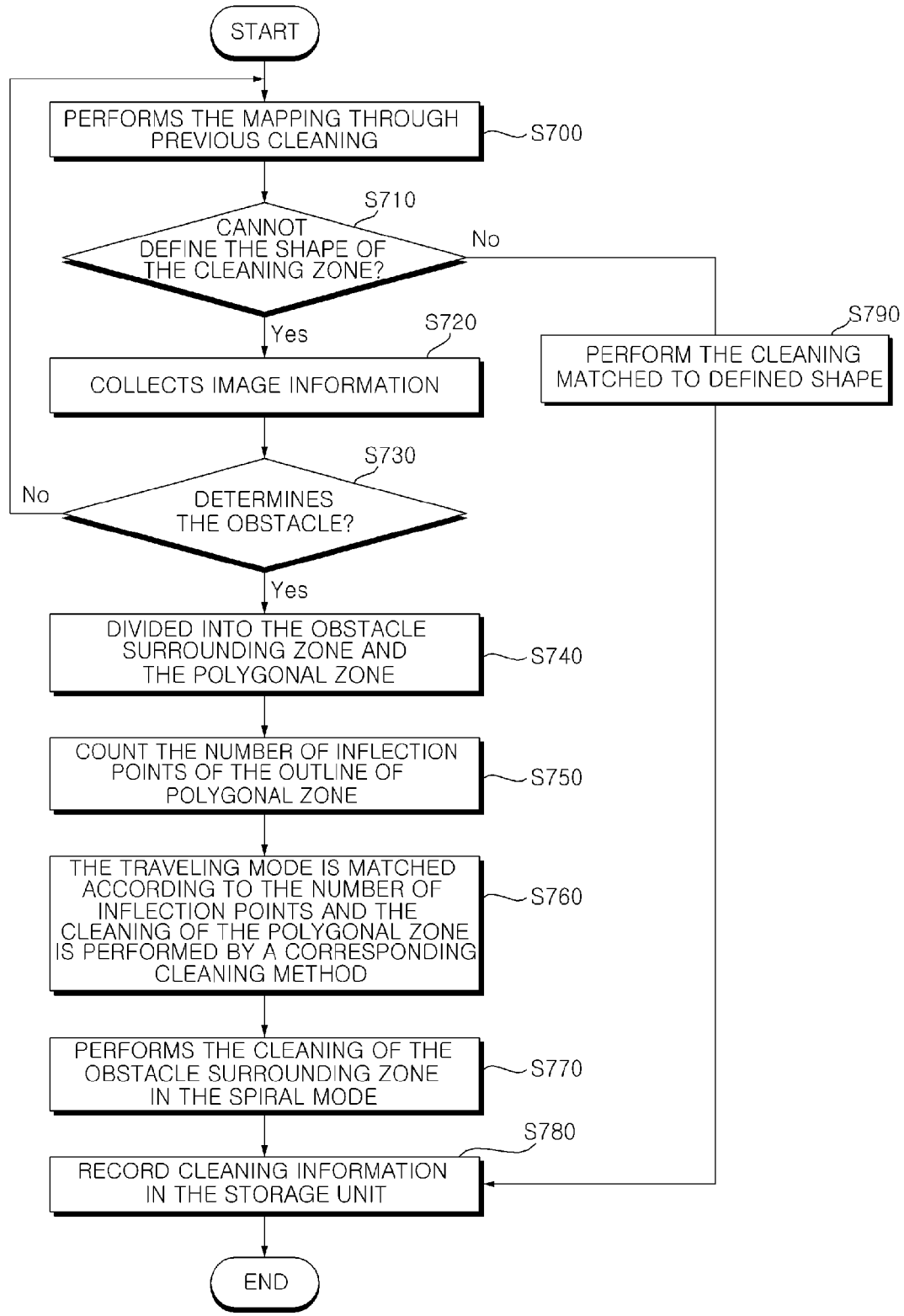

[Fig. 18]
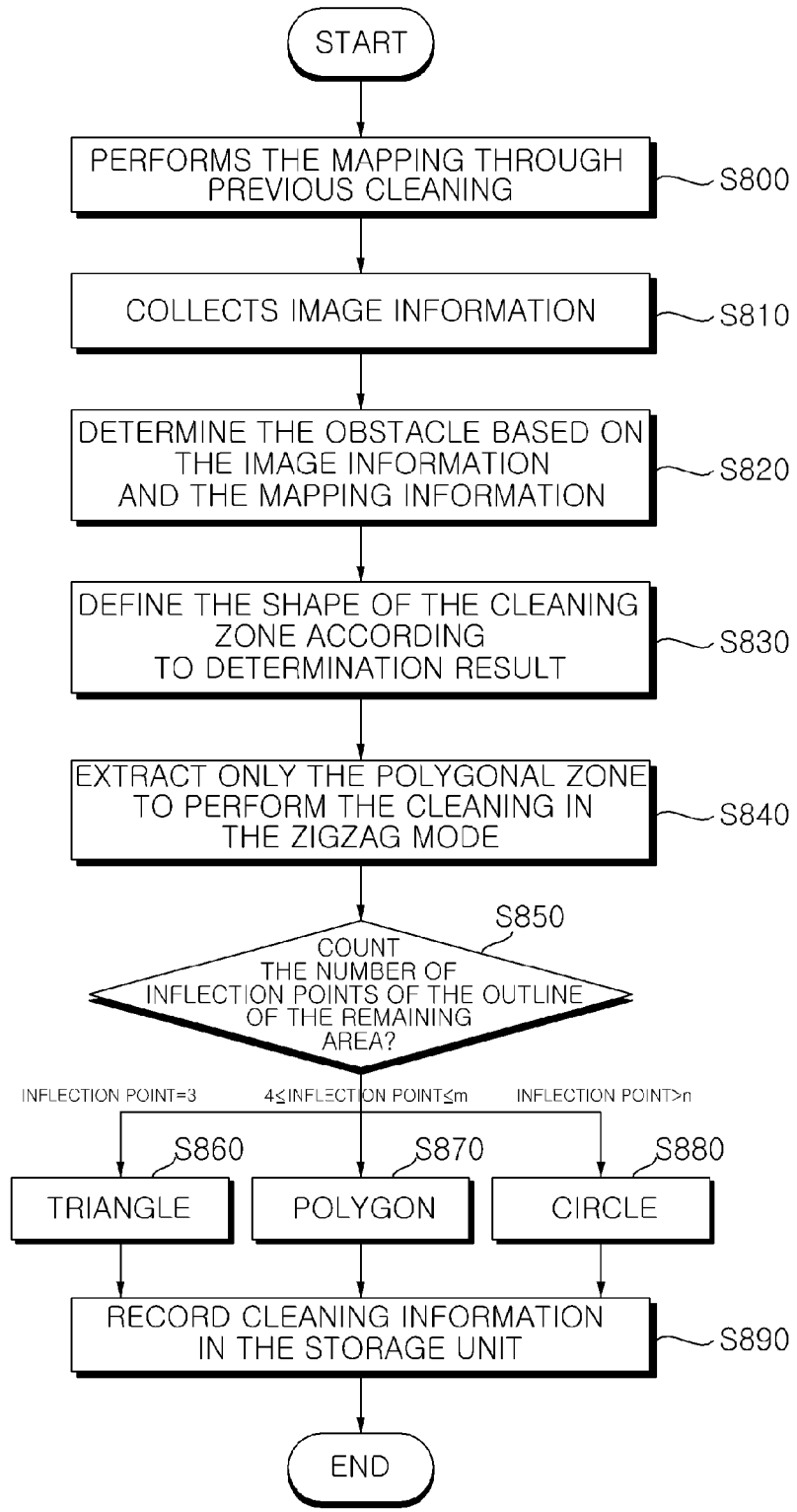

[Fig. 19A]
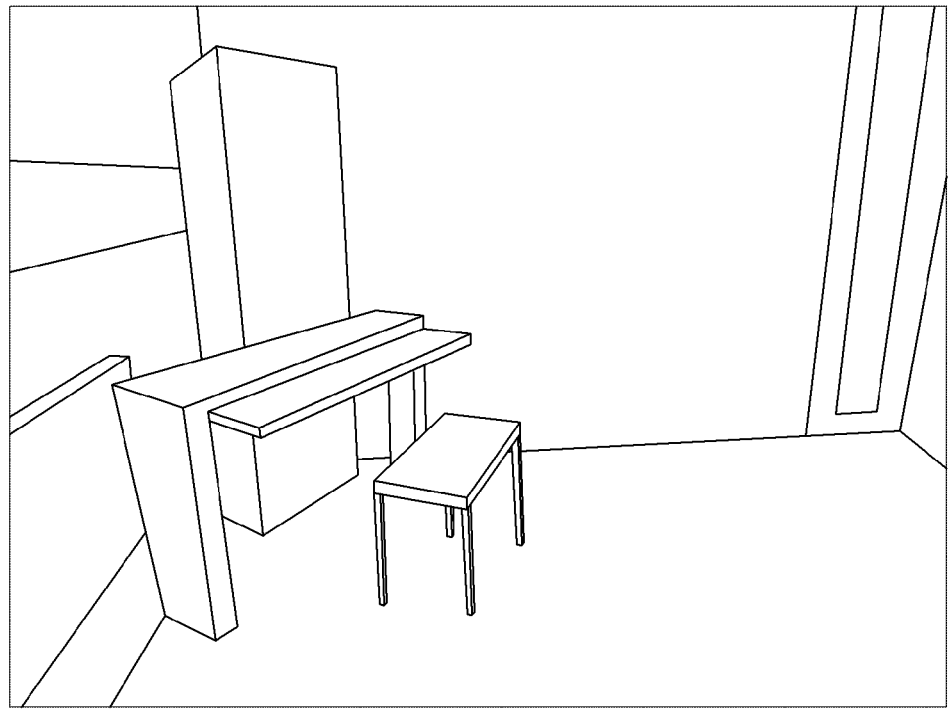
[Fig. 19B]
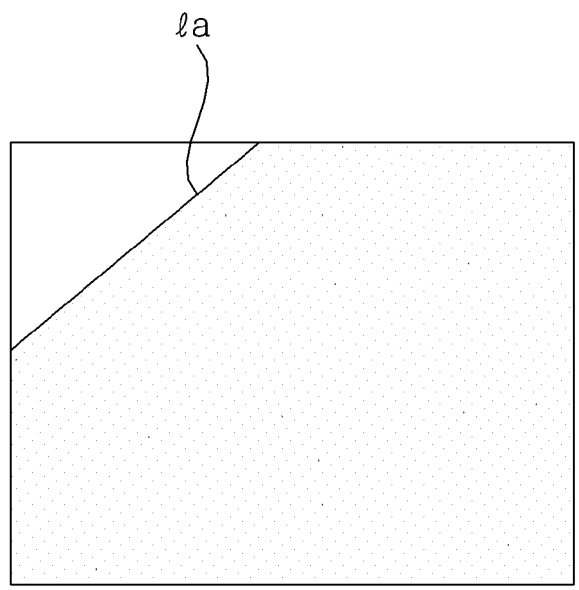

[Fig. 19C]
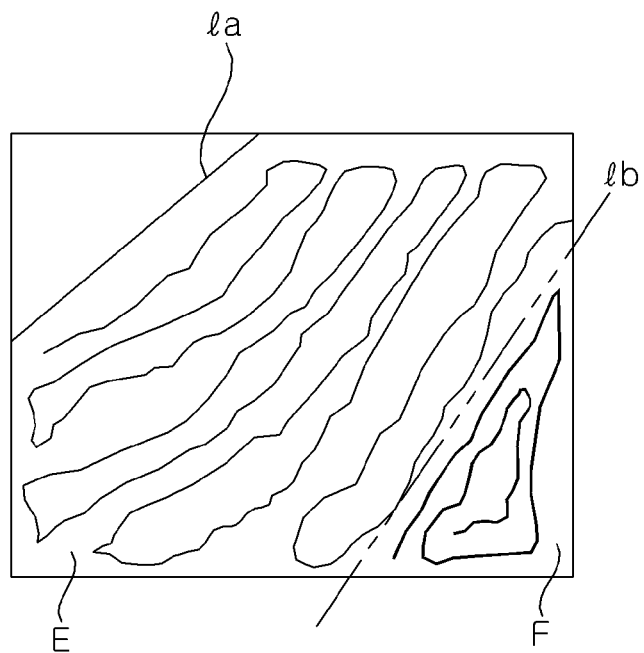
[Fig. 19D]
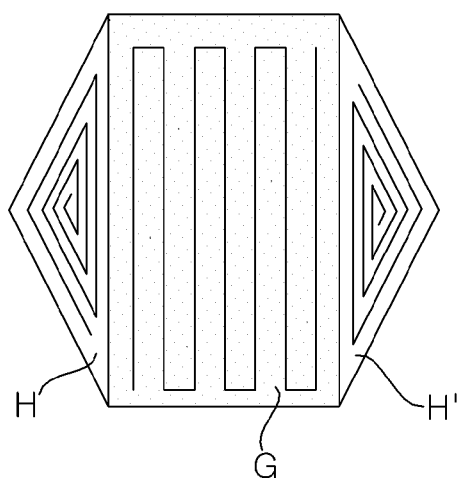

ROBOT CLEANER USING ARTIFICIAL INTELLIGENCE AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2020/004124, filed Mar. 26, 2020, which claims priority to Korean Patent Application No. 10-2019-0037202, filed Mar. 29, 2019, whose entire disclosures are hereby incorporated by reference.

TECHNICAL FIELD

The present disclosure relates to a robot cleaner and a method for controlling the robot cleaner, and more particularly, to a method of detecting a robot cleaner using artificial intelligence and a corresponding traveling technology.

BACKGROUND ART

Robots have been developed for industrial use and have been a part of factory automation.

In recent years, the application of robots has been further expanded, medical robots, aerospace robots, and the like have been developed, and home robots that can be used in general homes have also been manufactured. Among these robots, a robot capable of traveling by itself is called a moving robot. A representative example of a moving robot used in home is a robot cleaner.

Various technologies for detecting an environment and a user around the robot cleaner through various sensors provided in the robot cleaner are known. In addition, technologies which allow the robot cleaner to learn and map a traveling area by itself and to determine a current position on a map are known. A robot cleaner that travels and cleans a traveling area in a preset manner is known.

In addition, the prior art (Korean Patent Publication No. 10-2008-0090925) discloses a technology for performing pattern traveling outside of the zone in a zigzag along a traveling wall surface the while traveling a zone to be cleaned by itself.

PRIOR ART DOCUMENT

Patent Document (Patent Document 1) Korean Patent Publication No. 10-2008-0090925 (Published date: Oct. 19, 2008)

DISCLOSURE OF INVENTION

Technical Problem

A first object of the present disclosure is to suggest an efficient and accurate definition of a cleaning zone and a technology of dividing the cleaning zone.

In the prior art, a robot cleaner travels the cleaning zone in a zigzag traveling pattern that moves perpendicular to a wall by a distance determined by an algorithm of traveling along a left or right wall. In this traveling method, in a structure in which a shape of the cleaning zone is not rectangular, the zigzag pattern traveling that moves perpendicular to the wall surface is inefficient in the cleaning time or the cleaning zone. Therefore, a second object of the present disclosure is to solve this problem and provide a robot cleaner having improved efficiency by providing an optimum traveling mode according to a shape of the cleaning zone.

In addition, in the prior art, a zigzag mode, an edge mode, and a spiral mode are provided as a cleaning mode, and cleaning is performed in one traveling mode based on a mode selected by a user. In the prior art, since the cleaning is performed based on a rectangular space structure, there is a problem in that the efficiency is lowered based on a structural difference from the actual cleaning zone. Accordingly, a third object of the present disclosure is to provide a robot cleaner capable of improving efficiency by minimizing an area where cleaning is not performed by applying at least two traveling modes according to a shape of the cleaning zone.

Meanwhile, a fourth object of the present disclosure is to provide a robot cleaner capable of accurately dividing a cleaning zone by performing a learning of a cleaning zone through the previous cleaning of the robot cleaner and acquiring surrounding information through a camera and other sensors.

In addition, a fifth object of the present disclosure is to provide a robot cleaner for dividing into a plurality of sub spaces capable of cleaning operation in one traveling mode according to the area of the cleaning zone and performing cleaning in an optimal traveling mode according to a shape of the divided sub space.

Finally, a sixth object of the present disclosure is to determine the existence of an obstacle when the obstacle exists in the cleaning zone, to divide the zone into a zone containing the obstacle and other areas, and to perform cleaning in an optimal traveling mode according to a shape of the divided zones, thereby providing a robot cleaner having improved efficiency regardless of the existence of obstacle.

Solution to Problem

In an aspect, there is provided a robot cleaner including: a traveling unit configured to move a main body; a cleaning unit configured to perform a cleaning function; a sensing unit configured to detect a surrounding environment; and a controller configured to perform a previous cleaning, to map a cleaning zone based on information detected by the sensing unit, and to control to perform cleaning by matching different cleaning methods according to a shape of the mapped cleaning zone.

The controller collects information related to the cleaning zone while performing the previous cleaning in an edge mode or a zigzag mode.

The controller compares efficiencies of a cleaning method matched with the cleaning zone with a cleaning method in a basic mode, and performs a cleaning in a higher efficiency method.

The controller defines the shape of the cleaning zone according to the number of inflection points of an outline of the mapped cleaning zone.

The controller matches the cleaning method of an edge type mode when the number of inflection points of an outline of the mapped cleaning zone is three, matches the cleaning method of a spiral mode when the number of inflection points of the outline of the mapped cleaning zone is greater than n, and matches the cleaning method of a hybrid mode when the number of inflection points of the outline of the mapped cleaning zone is four or more, and m or less.

In the hybrid mode, the controller performs the cleaning method of the edge type mode, and then changes into the cleaning method of the spiral mode when remaining area is less than or equal to a certain range of a total area.

The controller changes the cleaning method, when the remaining area becomes 40% or less of the total area.

The controller divides the cleaning zone into a plurality of sub cleaning zones when an area of the mapped cleaning zone is greater than a first critical area, and performs cleaning by matching different cleaning methods according to the shape of each sub cleaning zone.

The controller generates a virtual line for space division at a vertex having an angle greater than or equal to a certain angle among vertices of the mapped cleaning zone.

The controller calculates an area of the plurality of sub cleaning zones, and matches the cleaning method according to the number of inflection points of an outline of the sub cleaning zone when the area of the sub cleaning zone is less than or equal to a second critical area.

When the mapped cleaning zone cannot be defined in a specific form, the controller receives image information of the previous cleaning from the sensing unit, checks whether there is an obstacle, and divides the cleaning zone into an obstacle surrounding zone and a polygonal zone.

The controller performs a cleaning of the obstacle surrounding zone in a spiral mode, and performs a cleaning of the polygonal zone in a zigzag mode.

The controller performs a cleaning of the obstacle surrounding zone in a spiral mode, and performs a cleaning of the polygonal zone in different cleaning methods according to the number of inflection points of an outline.

The controller defines the obstacle surrounding zone in a form of a frame surrounding the obstacle.

The controller defines the obstacle surrounding zone and the polygonal zone to be partly overlapped with each other.

The robot cleaner further includes a storage unit that records previous cleaning information of the robot cleaner, and provides previous cleaning information for the cleaning zone to the controller to utilize when the controller performs the mapping of the cleaning zone.

The controller reads the previous cleaning information for the cleaning zone to compare with mapping information due to the previous cleaning, and determines whether there is an obstacle when there is a change in a shape of the cleaning zone.

When it is determined that there is an obstacle, the controller newly determines a shape of the cleaning zone, and matches different cleaning methods according to the determined shape of the cleaning zone.

The controller extracts a polygonal zone that can be cleaned in a zigzag mode in the shape of the cleaning zone to perform cleaning in the zigzag mode, and matches different cleaning methods according to a shape of remaining area.

In another aspect, there is provided a method of controlling a robot cleaner, the method including: defining a shape of a cleaning zone through previous cleaning; matching different cleaning methods according to the shape of the cleaning zone; and performing a cleaning of the cleaning zone according to the matched cleaning method.

Defining a shape of the cleaning zone includes determining the shape of the cleaning zone according to the number of inflection points of an outline of the cleaning zone.

Advantageous Effects of Invention

Through the above solution, the present disclosure can provide a definition of accurate cleaning zone and a division of the cleaning zone, and provide an optimum cleaning traveling mode according to the divided cleaning zone to increase efficiency.

In addition, by applying at least two traveling modes according to the shape of the cleaning zone, it is possible to improve the efficiency by minimizing the zone where the cleaning is not performed.

Meanwhile, the present disclosure can accurately divide the cleaning zone by performing the learning of the cleaning zone through the previous cleaning of the robot cleaner, and learning the surrounding information through a camera and other sensors.

It is possible to provide an optimal traveling mode according to the shape of the divided sub space by dividing the cleaning zone into sub-spaces according to the area of cleaning zone. In addition, cleaning can be completed to remain no un-cleaned zone in spite of an obstacle by performing cleaning in an optimal traveling mode according to the shape of the divided area, by determining the existence of the obstacle when an obstacle exists in the cleaning zone, and dividing the cleaning zone into an area including the obstacle and other polygonal zones.

BRIEF DESCRIPTION OF DRAWINGS

FIG. 1 is a perspective view illustrating a robot cleaner 100 and a charging stand 200 for charging a robot cleaner according to an embodiment of the present disclosure.

FIG. 2 is an elevation view of the robot cleaner 100 of FIG. 1 when viewed from above.

FIG. 3 is an elevation view of the robot cleaner 100 of FIG. 1 when viewed from the front.

FIG. 4 is an elevation view of the robot cleaner 100 of FIG. 1 when viewed from below.

FIG. 5 is a block diagram illustrating a control relationship between main components of the robot cleaner 100 of FIG. 1.

FIG. 6 is a flowchart illustrating a control method of a robot cleaner according to an embodiment of the present disclosure.

FIG. 7 is a flowchart illustrating a first scenario of a process performed according to the control method of FIG. 6.

FIGS. 8A to 8D are diagrams illustrating a space recognition state that is performed according to the first scenario of FIG. 7.

FIG. 9 is a flowchart illustrating a second scenario of a process performed according to the control method of FIG. 6.

FIGS. 10A to 10C are diagrams illustrating a space recognition state that is performed according to the second scenario of FIG. 9.

FIG. 11 is a flowchart illustrating a third scenario of a process performed according to the control method of FIG. 6.

FIGS. 12A and 12B are diagrams illustrating a space recognition state that is performed according to the third scenario of FIG. 11.

FIG. 13 is a flowchart illustrating a control method of robot cleaner according to another embodiment of the present disclosure.

FIG. 14 illustrates a space division of the control method of robot cleaner according to another embodiment of FIG. 13.

FIG. 15 is a flowchart illustrating a control method of robot cleaner according to another embodiment of the present disclosure.

FIGS. 16A to 16D are diagrams illustrating a space recognition state of the control method of robot cleaner according to another embodiment of FIG. 15.

FIG. 17 is a flowchart illustrating a control method of robot cleaner according to another embodiment of the present disclosure.

FIG. 18 is a flowchart illustrating a control method of robot cleaner according to another embodiment of the present disclosure.

FIGS. 19A to 19D are diagrams illustrating a space recognition state according to the control method of FIG. 18.

MODE FOR THE INVENTION

In linguistic and mathematical comparisons throughout this description, 'less than or equal to' and 'less than' can be easily substituted with each other from a point of view of a person skilled in the art, 'greater than or equal to' and 'greater than' can be easily substituted with each other from a point of view of a person skilled in the art, and it is obvious that the substitution does not cause any problem in implementing the present disclosure.

A moving robot 100 of the present disclosure means a robot that can move itself by using a wheel or the like, and may be a home helper robot or a robot cleaner.

Hereinafter, referring to FIGS. 1 to 5, the robot cleaner 100 of the moving robot is described by way of an example, but is not limited thereto.

The robot cleaner 100 includes a main body 110. Hereinafter, in defining each portion of the main body 110, a portion facing the ceiling in the traveling area is defined as an upper surface portion (see FIG. 2), a portion facing the floor in the traveling area is defined as a bottom surface portion (see FIG. 4), and a portion facing the traveling direction, among the portions forming the circumference of the main body 110 between the upper surface portion and the bottom surface portion, is defined as a front surface portion (see FIG. 3). In addition, a portion facing in the opposite direction to the front surface part of the main body 110 may be defined as a rear surface portion. The main body 110 may include a case 111 forming a space in which various components of the robot cleaner 100 are accommodated.

The robot cleaner 100 includes a sensing unit 130 that detects a surrounding situation. The sensing unit 130 may detect information on the outside the robot cleaner 100. The sensing unit 130 detects a user around the robot cleaner 100. The sensing unit 130 may detect an object around the robot cleaner 100.

The sensing unit 130 may detect information on the cleaning zone. The sensing unit 130 may detect obstacle such as wall, furniture, and a cliff on the traveling surface. The sensing unit 130 may detect information on the ceiling. The sensing unit 130 may detect an object placed on the traveling surface and/or an external upper object. The external upper object may include a ceiling disposed in an upper direction of the robot cleaner 100 or a lower surface of furniture. Through the information detected by the sensing unit 130, the robot cleaner 100 may map a cleaning zone.

The sensing unit 130 may detect information related to a user around the robot cleaner 100. The sensing unit 130 may detect position information of the user. The position information may include direction information on the robot cleaner 100. The position information may include distance information between the robot cleaner 100 and the user. The sensing unit 130 may detect a direction of the user with respect to the robot cleaner 100. The sensing unit 130 may detect a distance between the user and the robot cleaner 100.

The position information may be directly acquired by detection of the sensing unit 130 or may be processed by a controller 140 and then be acquired.

The sensing unit 130 may include an image detecting unit 135 that detects an image of a surrounding. The image detecting unit 135 may detect an image in a specific direction with respect to the robot cleaner 100. For example, the image detecting unit 135 may detect an image in front of the robot cleaner 100. The image detecting unit 135 photographs a traveling area and may include a digital camera. The digital camera may include at least one optical lens, an image sensor (e.g. a CMOS image sensor) configured to include a plurality of photodiodes (e.g. pixel) forming an image by the light passed through the optical lens, and a digital signal processor (DSP) for constituting an image based on a signal output from the photodiode. The digital signal processor may generate not only a still image but also a moving image formed of frames composed of the still image.

The sensing unit 130 may include a distance detecting unit 131 that detects a distance to a surrounding wall. The distance between the robot cleaner 100 and the surrounding wall may be detected through the distance detecting unit 131. The distance detecting unit 131 detects the distance to the user in a specific direction of the robot cleaner 100. The distance detecting unit 131 may include a camera, an ultrasonic sensor, or an infrared (IR) sensor.

The distance detecting unit 131 may be disposed in the front surface portion of the main body 110 or may be disposed in the side portion.

The distance detecting unit 131 may detect a surrounding obstacle. A plurality of distance detecting unit 131 may be provided.

The sensing unit 130 may include a cliff detecting unit 132 that detects the existence of a cliff on the floor in the traveling area. A plurality of cliff detecting units 132 may be provided.

The sensing unit 130 may further include a lower image sensor 137 that acquires an image of the floor.

The robot cleaner 100 includes a traveling unit 160 to move the main body 110. The traveling unit 160 moves the main body 110 with respect to the floor. The traveling unit 160 may include at least one drive wheel 166 to move the main body 110. The traveling unit 160 may include a drive motor. The drive wheel 166 may be provided in the left and right sides of the main body 110 respectively, and hereinafter, are referred to as a left wheel 166(L) and a right wheel 166(R).

The left wheel 166(L) and the right wheel 166(R) may be driven by a single drive motor, but if necessary, a left wheel drive motor which drives the left wheel 166(L) and a right wheel drive motor which drives the right wheel 166(R) may be provided respectively. By making a difference between the rotational speeds of the left wheel 166(L) and the right wheel 166(R), the traveling direction of the main body 110 can be switched to the left or the right.

The robot cleaner 100 includes a cleaning unit 180 which performs a cleaning function.

The robot cleaner 100 may move the cleaning zone and clean the floor by the cleaning unit 180. The cleaning unit 180 may include a suction unit for suctioning foreign matter, a brush 184, 185 for brushing foreign matter, a dust container (not shown) for storing the foreign matter collected by the suction unit or the brush, and/or a mop unit (not shown) for mopping, and the like.

A suction port 180h through which air is sucked may be formed in the bottom surface portion of the main body 110. In the main body 110, a suction unit (not shown) that provides suction power so that air can be sucked through the suction port 180*h*, and a dust container (not shown) that collects dust sucked with air through the suction port 180*h* may be provided.

An opening for inserting and detaching the dust container may be formed in the case 111, and a dust container cover 112 for opening and closing the opening may be rotatably provided with respect to the case 111.

A roll-shaped main brush 184 having brushes exposed through the suction port 180*h*, and an auxiliary brush 185 which is positioned in the front side of the bottom surface portion of the main body 110, and has a brush formed of a plurality of radially extended feathers may be provided. The rotation of these brushes 184 and 185 removes dust from the floor in the travel zone, and the dust separated from the floor is sucked through the suction port 180*h* and collected in the dust container.

The battery 138 may supply power not only necessary for the drive motor but also necessary for the overall operation of the robot cleaner 100. When the battery 138 is discharged, the robot cleaner 100 may travel to return to the charging stand 200 so as to perform charging, and during this return traveling, the robot cleaner 100 may detect the position of the charging stand 200.

The charging stand 200 may include a signal transmitter (not shown) for transmitting a certain return signal. The return signal may be an ultrasonic signal or an infrared signal, but is not necessarily limited thereto.

Meanwhile, the image detecting unit 135 is provided in the upper surface portion of the main body 110 to acquire an image of the ceiling in the cleaning zone, but the position and the photographing range of the image detecting unit 135 is not necessarily limited thereto. For example, the image detecting unit 135 may be provided to acquire an image of the front of the main body 110.

In addition, the robot cleaner 100 may further include an operation unit (not shown) that may input On/Off or various commands.

Referring to FIG. 5, the robot cleaner 100 includes a storage unit 150 that stores various data. Various data necessary for the control of the robot cleaner 100 may be recorded in the storage unit 150. The storage unit 150 may include a volatile or nonvolatile recording medium. The recording medium stores data that can be read by a microprocessor, and includes a hard disk drive (HDD), a solid state disk (SSD), a silicon disk drive (ROM), a ROM, a RAM, a CD-ROM, a Magnetic tape, a floppy disk, an optical data storage device, and the like.

The storage unit 150 may store a map of the cleaning zone. The map may be input by an external terminal that may exchange information with the robot cleaner 100 through wired or wireless communication or may be generated by the robot cleaner 100 by learning by itself. In the former case, examples of the external terminal may include a remote controller, a PDA, a laptop, a smartphone, a tablet, and the like, which are equipped with an application for setting a map.

The map may display positions of a plurality of nodes corresponding to (one-to-one correspondence) a plurality of points in a cleaning zone. The map may display each area within the cleaning zone. In addition, the current position of the robot cleaner 100 may be displayed on the map. The current position of the robot cleaner 100 on the map may be updated during the traveling process.

A traveling displacement measuring unit 165 may measure a traveling displacement based on the image acquired by the image detecting unit 135. The traveling displacement conceptually includes a moving direction and a moving distance of the robot cleaner 100. For example, the traveling displacement measuring unit 165 may measure the traveling displacement through a continuous pixel comparison of the floor image which varies according to the continuous movement of the robot cleaner 100.

In addition, the traveling displacement measuring unit 165 may measure the traveling displacement of the robot cleaner 100 based on the operation of the traveling unit 160. For example, the controller 140 may measure the current or past moving speed of the robot cleaner 100, the distance traveled, and the like based on the rotation speed of the traveling wheel 136, and may also measure the current or past direction change process according to the rotation direction of each traveling wheel 136(L), 136(R).

The traveling displacement measuring unit 165 may measure the traveling displacement using at least one of the distance detecting unit 131 and the image detecting unit 135.

The controller 140 may recognize the position of the robot cleaner 100 on the map, based on the measured traveling displacement.

A transmitter 170 may transmit information of the robot cleaner to other robot cleaner or a central server. A receiver 190 may receive information from other robot cleaner or a central server. The information transmitted by the transmitter 170 or the information received by the receiver 190 may include configuration information of the robot cleaner.

The robot cleaner 100 includes a controller 140 for processing and determining various information. The controller 140 may perform information processing for learning the cleaning zone. The controller 140 may perform information processing for recognizing the current position on the map. The controller 140 may control the overall operation of the robot cleaner 100 through a control of various configurations (e.g. the traveling displacement measuring unit 165, the distance detecting unit 131, the image detecting unit 135, the traveling unit 160, the transmitter 170, the receiver 190, etc.) constituting the robot cleaner 100.

The control method according to the present embodiment may be performed by the controller 140. The present disclosure may be a control method of the robot cleaner 100, or may be a robot cleaner 100 including a controller 140 performing the control method. The present disclosure may be a computer program including each step of the control method, or may be a recording medium on which a program for implementing the control method in a computer is recorded. The term 'recording medium' means a computer-readable recording medium. The present disclosure may be a moving robot control system including both hardware and software.

The controller 140 of the robot cleaner 100 processes and determines various types of information such as mapping and/or recognizing a current position. The controller 140 may be configured to map the cleaning zone through the image and the learning and to be able to recognize the current position on the map. That is, the controller 140 may perform a simultaneous localization and mapping (SLAM) function.

The controller 140 may control the driving of the traveling unit 160. The controller 140 may control the operation of the cleaning unit 180.

The robot cleaner 100 includes a storage unit 150 for storing various data. The storage unit 150 records various types of information necessary for the control of the robot cleaner 100 and may include a volatile or nonvolatile recording medium.

The actual cleaning zone may correspond to the cleaning zone on the map. The cleaning zone may be defined as the sum of a zone on all planes where the robot cleaner 100 has ever traveled and a zone on a plane where the robot cleaner 100 is currently traveling.

The controller 140 may determine a moving path of the robot cleaner 100 based on the operation of the traveling unit 160. For example, the controller 140 may determine the current or past moving speed of the robot cleaner 100, the distance traveled, and the like based on the rotational speed of the drive wheel 166, and may also determine the current or past direction change process according to the rotation direction of each drive wheel 166(L), 166(R). Based on the determined traveling information of the robot cleaner 100, the position of the robot cleaner 100 on the map may be updated. In addition, the position of the robot cleaner 100 on the map may be updated by using the image information.

Specifically, the controller 140 controls the traveling of the robot cleaner 100, and controls the driving of the traveling unit 160 according to a set traveling mode. As the traveling mode of the traveling unit 160, a zigzag mode, an edge mode, a spiral mode, or a hybrid mode may be selectively set.

The zigzag mode is defined as a mode of traveling in a zigzag manner and performing cleaning while being spaced apart from a wall or an obstacle by a certain distance or more. The edge mode is defined as a mode of performing cleaning while traveling in a zigzag manner close by the wall. The spiral mode is defined as a mode of cleaning spirally within a certain area based on one place in waiting.

Meanwhile, the controller 140 generates a map of the cleaning zone. That is, the controller 140 may form a map of the cleaning zone based on a position recognized through the previous cleaning and an image acquired at each point. The controller 140 matches the image acquired at each point with each node on the map. The acquired images may be in one-one correspondence with the nodes.

The controller 140 may also generate a map based on the traveling displacement between nodes. The controller 140 may also update a pre-generated map, classify the type of cleaning zone of the generated map according to the condition, and match the cleaning method according to the classified type. In addition, the controller 140 calculates the efficiency of performing a cleaning in a basic mode and performing a cleaning in a matched cleaning method, and executes the cleaning of the robot cleaner 100 in a high efficiency method.

In addition, the controller 140 may divide the cleaning zone according to the mapped cleaning zone to match an optimal cleaning method according to the type of each sub-cleaning zone. In addition, the controller 140 may determine whether an obstacle exists, and if an obstacle exists, may divide the cleaning zone to match the optimal cleaning method according to the type of each divided sub cleaning zone.

The controller 140 may recognize the current position using at least one of the distance detecting unit 131 and the image detecting unit 135, and may recognize the current position on the map.

The input unit 171 may receive On/Off or various commands. The input unit 171 may include a button, a key, or a touch type display, or the like. The input unit 171 may include a microphone for speech recognition.

The output unit 173 may inform the user of various types of information. The output unit 173 may include a speaker and/or a display.

As described above, the controller 140 provides a control method for performing a previous cleaning and mapping the cleaning zone using the acquired information, and matching the optimal cleaning method according to the type of the mapped cleaning zone.

Hereinafter, a cleaning operation of the robot cleaner according to an embodiment of the present disclosure will be described with reference to FIGS. 6 to 19.

FIG. 6 is a flowchart illustrating a control method of a robot cleaner 100 according to an embodiment of the present disclosure.

Contents overlapped with each other in the flowchart are denoted by the same reference numerals, and overlapped descriptions are omitted.

The control method may be performed by the controller 140. Each step of the flowchart of the control method and a combination of the steps may be performed by computer program instructions. The instructions may be mounted in a general purpose computer or special purpose computer, etc., such that the instructions create means for performing the functions described in the flowchart step(s).

In addition, it is also possible in some embodiments that the functions mentioned in the steps occur out of order. For example, two steps shown in succession may actually be performed substantially simultaneously or the steps may sometimes be performed in the reverse order, according to a corresponding function.

Referring to FIG. 6, a control method according to an embodiment includes a mapping performing step through previous cleaning, a cleaning zone shape classification step according to a mapping result, a cleaning method matching step according to a cleaning zone shape, an efficiency determination step, and a cleaning progress step according to a determination result.

When the robot cleaner 100 starts to operate, the robot cleaner 100 performs a mapping performing step through previous cleaning (S100).

The previous cleaning is used to determine the shape of the cleaning zone, and the traveling may be performed in the edge mode or the zigzag mode as a traveling mode for determining the size and shape of a space to be cleaned.

In this case, when traveling in the edge mode or the zigzag mode, the traveling distance may be wider in comparison with a normal cleaning mode.

The controller 140 may perform the previous cleaning to form a map of the cleaning zone. That is, when the previous cleaning is completed, the controller 140 records a time required for completion and a cleaning zone in which the previous cleaning is performed.

The controller 140 creates a map for the cleaning zone in consideration of all of the previous cleaning traveling speed of the robot cleaner 100, the traveling time, and the traveling area according to the traveling direction.

If there is a previous map applied to a previous cleaning for the cleaning zone among the maps recorded in the storage unit 150, the current map may be overlapped with the previous map for the cleaning zone and an error portion may be corrected, thereby enhancing accuracy.

When the mapping to the cleaning zone is completed as described above, the controller 140 classifies the shape of the cleaning zone according to the mapping result (S110).

Specifically, according to the mapping result, the shape of the cleaning zone may be classified into a circle, a triangle, a polygon, and a hybrid type according to the number of inflection points.

Next, when the shapes of cleaning zones are classified, a preset cleaning method is matched according to the shape of classified cleaning zone (S120). In this case, when the shape of the cleaning zone is a triangle, it is possible to match the cleaning method of an edge type mode. When it is determined that the shape of the cleaning zone is circular, it is possible to match the cleaning method of the spiral mode. In addition, when the shape of the cleaning zone is a polygon, it is possible to match the cleaning method of a hybrid mode which is a mixture of the edge type and the spiral type.

When the cleaning zone is classified as a hybrid type, the cleaning zone may be partially divided and different cleaning methods may be matched to each sub cleaning zone. For example, a quadrangle can be separated from the polygon shape.

Next, the controller 140 performs a step of comparing the efficiencies of the matched cleaning method and the basic mode with each other (S130).

That is, an estimated required time when the cleaning zone is cleaned in the basic mode, i.e. in the zigzag or edge type mode and the area where the cleaning is completed are calculated, and an estimated required time when the cleaning zone is cleaned by the matched cleaning method and area where the cleaning is completed are calculated.

With reference to the calculation result, the cleaning efficiency in each mode is compared with each other. If the efficiency of the matched cleaning method is higher than the cleaning efficiency of the basic mode, the cleaning zone is cleaned in the matched cleaning method (S140).

Meanwhile, if the efficiency of the matched cleaning method is lower than the cleaning efficiency of the basic mode (S160), the cleaning zone is cleaned in a preset basic mode.

When the cleaning of the cleaning zone is completed, the cleaning result for a corresponding cleaning zone is recorded in the storage unit 150 and may be referred to at the next cleaning process (S150).

As described above, in the control method of the robot cleaner 100 according to the embodiment of the present disclosure, the cleaning zone is mapped through the previous cleaning to match a suitable cleaning method according to the shape of the cleaning zone and calculate the efficiency so that an optimal cleaning method can be applied to the cleaning zone.

Hereinafter, a control method of the robot cleaner 100 according to the shape of each cleaning zone will be described in detail.

FIG. 7 is a flowchart illustrating a first scenario of a process performed according to the control method of FIG. 6, and FIGS. 8A to 8D are diagrams illustrating a space recognition state that is performed according to the first scenario of FIG. 7.

The control method of the robot cleaner 100 of FIG. 7 may include a mapping performing step through previous cleaning, a cleaning zone shape classification step according to a mapping result, a cleaning method matching step according to a cleaning zone shape, an efficiency determination step, and a cleaning progress step according to a determination result.

When the robot cleaner 100 starts to operate, the robot cleaner 100 performs a mapping performing step through previous cleaning (S200). The previous cleaning is used to determine the shape of the cleaning zone, and the traveling may be performed in the edge mode or the zigzag mode as a traveling mode for determining the size and shape of a space to be cleaned.

The controller 140 may continuously receive information on the cleaning zone through the sensing unit 130 during the previous cleaning. That is, during the previous cleaning, the controller 140 may perform mapping for the cleaning zone, based on the image photographed by a camera (not shown) mounted in the front side of the main body 110 and the traveling information due to the previous cleaning.

In the case where the cleaning zone is formed as shown in FIG. 8A, mapping of the cleaning zone such as the region shown by the dotted line may be implemented through previous cleaning.

When the mapping is completed, the shape of the cleaning zone is determined (S210). That is, it is possible to count the shape of the cleaning zone mapped as shown in FIG. 8B, specifically, the number of inflection points in the shape of the outline. As shown in FIG. 8B, it is determined whether the shape of the cleaning zone is formed of a closed curve composed of three inflection points n1, n2, and n3, and when the shape of the outline forms a triangle composed of a closed curve having three inflection points, it is possible to match a preset edge-type cleaning method to the triangular cleaning zone as shown in FIG. 8C (S220).

Next, the controller 140 performs a step of comparing the efficiencies of the matched cleaning method and the basic mode with each other (S230).

That is, the controller 140 calculates the area (a, c) where the cleaning is completed when the cleaning zone is cleaned in the matched edge type mode as shown in FIG. 8D, and calculates the area b where the cleaning is completed when the cleaning zone is cleaned in the basic mode, i.e. the zigzag mode.

At this time, the area (a, c) where the cleaning is completed when the cleaning zone is cleaned in the matched edge type mode may be a total area added up the area (c) where straight line cleaning is proceeded, when the area (a) where cleaning is performed in the edge type mode and the remaining cleaning area are smaller than a certain size and a triangle is not formed so that the edge type mode is not available. In this case, when the efficiency of the matched cleaning method is greater than the efficiency of the basic mode that is a zigzag mode, the cleaning zone is cleaned by the cleaning method of the matched edge type mode (S240).

Meanwhile, if the efficiency in the zigzag mode is greater, the cleaning zone is cleaned in the zigzag mode (S260).

When the cleaning of the cleaning zone is completed, the cleaning zone and the information on the cleaning performing may be stored in the storage unit 150 and be used as raw data in the next cleaning performing (S250).

FIG. 9 is a flowchart illustrating a second scenario of a process performed according to the control method of FIG. 6, and FIGS. 10A to 10C are diagrams illustrating a space recognition state that is performed according to the second scenario of FIG. 9.

The control method of the robot cleaner 100 of FIG. 9 may include a mapping performing step through previous cleaning, a cleaning zone shape classification step according to a mapping result, a cleaning method matching step according to a cleaning zone shape, an efficiency determination step, and a cleaning progress step according to a determination result.

When the robot cleaner 100 starts to operate, the robot cleaner 100 performs a mapping performing step through previous cleaning (S300). The previous cleaning is used to determine the shape of the cleaning zone, and the traveling may be performed in the edge mode or the zigzag mode as a traveling mode for determining the size and shape of a space to be cleaned.

The controller 140 may continuously receive the information on the cleaning zone through the sensing unit 130 during the previous cleaning. That is, during the previous cleaning, the controller 140 may perform mapping to the cleaning zone based on the image photographed by a camera (not shown) mounted in the front side of the main body 110 and the traveling information due to previous cleaning.

When the cleaning zone is formed as shown in FIG. 10A, mapping of the cleaning zone such as the area shown by the dotted line may be implemented through previous cleaning.

When the mapping is completed, the shape of the cleaning zone is determined (S310). That is, it is possible to count the number of inflection points in the shape of the cleaning zone mapped as shown in FIG. 10B, specifically, in the shape of the outline. As shown in FIG. 10B, when the number of inflection points is larger than a reference value n and the cleaning zone appears to be circular, for example, it is determined whether the number of inflection points is formed by a closed curve larger than nine (n=9), and the cleaning zone is determined to be circular (S320), and then the preset spiral cleaning method may be matched to the cleaning zone (S330).

Next, the controller 140 compares the efficiencies of the matched cleaning method and the basic mode with each other (S340).

That is, the controller 140 calculates an area a in which cleaning is completed when cleaning zone is cleaned in the matched spiral mode as shown in FIG. 10C, and calculates an area b in which cleaning is completed when cleaning zone is cleaned in the basic mode, i.e. in the zigzag mode.

When the efficiency of the matched cleaning method is higher than the efficiency of the basic mode which is the zigzag mode, the cleaning zone is cleaned by the cleaning method in the matched spiral mode (S350).

Meanwhile, when the efficiency in the zigzag mode is higher, the cleaning zone is cleaned in the zigzag mode (S370).

When the cleaning of the cleaning zone is completed, the information related to the cleaning zone and the cleaning performing may be stored in the storage unit 150 and may be used as raw data (raw data in the next cleaning performing (S360).

FIG. 11 is a flowchart illustrating a third scenario of a process performed according to the control method of FIG. 6, and FIGS. 12A and 12B are diagrams illustrating a space recognition state that is performed according to the third scenario of FIG. 11.

The control method of the robot cleaner 100 of FIG. 11 may include a mapping performing step through previous cleaning, a cleaning zone shape classification step according to a mapping result, a cleaning method matching step according to a cleaning zone shape, an efficiency determination step, and a cleaning progress step according to a determination result.

When the robot cleaner 100 starts to operate, the robot cleaner 100 performs a mapping performing step through previous cleaning (S400). The previous cleaning is used to determine the shape of the cleaning zone.

The controller 140 may continuously receive the information on the cleaning zone through the sensing unit 130 during the previous cleaning. That is, during the previous cleaning, the controller 140 may perform mapping to the cleaning zone based on the image photographed by a camera (not shown) mounted in the front side of the main body 110 and the traveling information due to previous cleaning.

When the cleaning zone is formed as shown in FIG. 12A, mapping of the cleaning zone such as the area shown by the dotted line may be implemented through previous cleaning.

When the mapping is completed, the shape of the cleaning zone is determined (S410). That is, the shape of the cleaning zone mapped as shown in FIG. 12B may be determined and, specifically, the number of inflection points in the shape of the outline may be counted. As shown in FIG. 12B, when the number of inflection points is equal to or more than four and is equal to or less than m, for example, when the shape of the cleaning zone is formed of a closed curve having the number of inflection points that is equal to or more than four and is equal to or less than nine (m=9), the cleaning zone is determined to be polygon (S420).

If the cleaning zone is a polygon, it is possible to match the preset edge-type cleaning method (S430). At this time, in the cleaning zone of polygon, a part of the total area, e.g. up to 60% of the total area, is cleaned in a preset edge type mode, and if the remaining area corresponds to 40% of the total area, it is switched to the spiral mode, thereby implementing a hybrid mode that performs cleaning.

In this case, 60% area is not limited thereto, and may be set to a state in which the angle of the inflection point is increased beyond a certain range so that it is determined to be circular.

Next, the controller 140 compares the efficiencies of the matched cleaning method and the basic mode with each other (S440).

That is, the controller 140 calculates an area in which cleaning is completed when cleaning zone is cleaned by the cleaning method of a hybrid mode of the edge type and the spiral type, and calculates an area in which cleaning is completed when cleaning zone is cleaned in the basic mode, i.e. in the zigzag mode.

When the efficiency of the matched cleaning method is higher than the efficiency of the basic mode which is the zigzag mode, the cleaning zone is cleaned by the cleaning method in the matched hybrid mode (S450).

Meanwhile, when the efficiency in the zigzag mode is higher, the cleaning zone is cleaned in the zigzag mode (S470).

When the cleaning of the cleaning zone is completed, the information related to the cleaning zone and the cleaning performing may be stored in the storage unit 150 and may be used as raw data (raw data in the next cleaning performing (S460).

Meanwhile, the controller 140 of the robot cleaner 100 according to an embodiment of the present disclosure may match an optimal cleaning method according to a shape of divided sub-cleaning zone, after dividing a space according to the area of the mapped cleaning zone.

FIG. 13 is a flowchart illustrating a control method of robot cleaner according to another embodiment of the present disclosure, and FIG. 14 illustrates a space division of the control method of robot cleaner according to another embodiment of FIG. 13.

The control method of the robot cleaner 100 of FIG. 13 performs the mapping performing step through the previous cleaning in the same manner as in the previous embodiments.

That is, the robot cleaner 100 performs the mapping performing step through the previous cleaning (S500).

When the mapping is completed, the shape of the cleaning zone is determined. At this time, when the area of the cleaning zone mapped as shown in FIG. 14 is larger than a first critical area (S510), the cleaning zone is divided (S520).

Specifically, when the angle of the continuous vertex is 180 degrees or more, a virtual line dividing the angle at a corresponding vertex may be calculated.

For example, when defining a first sub-cleaning zone S1 of FIG. 14, a vertex that begins is defined as a starting point (no), and when a first vertex that is encountered for the first time while progressing along the wall in a first direction from the starting point (no) is defined as a first vertex n1, if a significant difference of the first angle_1 of the first vertex n1 is large, e.g. 180 degrees or more, a virtual first line 11 dividing the first angle_1 at the first vertex n1 can be calculated.

In this case, the angle by which the first line 11 divides the first angle_1 may be half the first angle_1 or smaller, and may be adjusted according to the area of the sub cleaning zone.

Meanwhile, when a first vertex that is encountered for the first time while progressing along the wall in a second direction opposite to the first vertex n1 from the starting point (no) is defined as a second vertex n2, and the next vertex is defined as a third vertex n3, if the angle of the second vertex n2 or the third vertex n3 exceeds 180 degrees, for example, at the third vertex n3 in FIG. 14, a virtual first line 12 dividing the third angle_3 which is the angle of the third vertex n3 may be calculated.

In this case, the second line 12 may be a line that bisects the third angle_3, or may be a line that divides the third angle_3 at a smaller ratio than half.

In this case, a contact point of the first line 11 and the second line 12 in the cleaning zone is defined as a virtual fourth vertex n4.

As described above, a first sub cleaning zone S1 in one cleaning zone may be defined as a pentagon-shaped space consisting of the virtual fourth vertex n4 from the starting point (no).

In this case, the ratio of dividing the angle may be fixed, but can be changed according to the divided area.

Next, the angle division is performed at a sixth vertex (n6) having a significant difference among a fifth vertex n5 and the sixth vertex n6 that are encountered while progressing along the wall in the first direction from the first vertex n1, for example, the significant difference means an angle of 180 degrees or more.

That is, the third line 13 dividing the angle of the sixth vertex n6 may be calculated, and at this time, the third line 13 may be a line bisecting the sixth vertex n6.

Meanwhile, since the angle of the fourth vertex n4 is 180 degrees or more, the fourth line 14 for dividing the fourth vertex n4 is calculated so that a virtual seventh vertex n7 which is a contact point between the third line 13 and the fourth line 14 is formed.

As described above, a pentagonal second sub cleaning zone S2, which is composed of the fifth, sixth, seventh and fourth vertices n5, n6, n7, n4 starting from the first vertex n1, is defined.

In a similar manner, neighboring sub cleaning zones (S1, S2, S3 . . . Sp, p=6 in FIG. 14) may be defined so that one cleaning zone can be divided into a plurality of sub cleaning zones S1, S2, S3 . . . Sp.

Next, if one sub cleaning zone is defined, it is determined whether the defined sub cleaning zone is smaller than a second critical area (S530).

In this case, the second critical area for determining the size of the sub cleaning zone may be smaller than the first critical area for determining the size of the cleaning zone for the first time.

If the size of the sub cleaning zone is greater than or equal to the second critical area, the angle is adjusted again at a vertex having a large significant difference in the cleaning zone to change the area of the sub cleaning zone.

Next, when the size of the sub cleaning zone is smaller than the second critical area, the number of inflection points of the outline of the sub cleaning zone is counted (S540).

That is, when the number of counted inflection points is three, the shape of a corresponding sub cleaning zone is defined as a triangle, and the cleaning method and the sub cleaning zone are matched through the control method of FIG. 7 (S550).

When the number of counted inflection points exceeds n, the shape of a corresponding sub cleaning zone is determined to be a circle, and the cleaning method and a corresponding sub cleaning zone are matched through the control method of FIG. 9 (S570).

Meanwhile, when the number of counted inflection points is 4 or more and m or less, the shape of the sub cleaning zone is defined as a polygon, and the cleaning method and a corresponding cleaning zone are matched through the control method corresponding to FIG. 11 (S560).

The controller 140 performs cleaning of a corresponding sub cleaning zone according to each cleaning method matched to each sub cleaning zone.

As described above, when the area of the cleaning zone determined through the previous cleaning is larger than the critical area, the cleaning zone may be divided into a certain area, and the optimal cleaning method may be matched to each sub cleaning zone by determining the shape of the divided sub cleaning zone.

Therefore, the optimum cleaning suitable for the shape of the space can be performed while omitting no space even in the large area cleaning zone.

When the cleaning of the cleaning zone is completed, the information related to the cleaning zone and the cleaning performing is stored in the storage unit 150 and may be used as raw data in the next cleaning performing (S580).

Meanwhile, when it is impossible to define a space of the cleaning zone by the previous cleaning, the controller 140 of the robot cleaner 100 according to an embodiment of the present disclosure may receive image information through the image detection unit and determine the existence and shape of obstacle so that the shape of the cleaning zone can be defined.

Hereinafter, a cleaning control method in the case where an obstacle is disposed in the cleaning zone will be described with reference to FIGS. 15 to 19.

FIG. 15 is a flowchart illustrating a control method of robot cleaner according to another embodiment of the present disclosure, and FIG. 16 is a diagram illustrating a space recognition state of the control method of robot cleaner according to another embodiment of FIG. 15.

The control method of the robot cleaner 100 of FIG. 15 performs a mapping performing step through the previous cleaning in the same manner as in the previous embodiments.

That is, the robot cleaner 100 performs the mapping performing step through the previous cleaning (S600).

When the mapping is completed, the shape of the cleaning zone is determined (S610). In this case, when there is an obstacle A within the cleaning zone as shown in FIG. 16A, the controller 140 of the robot cleaner 100 cannot define the shape of the cleaning zone implemented by mapping through previous cleaning as a specific figure.

At this time, the controller 140 collects an image of the previous cleaning for the cleaning zone through the image detecting unit 135 (S620).

The controller 140 reads the mapped cleaning zone and the image information together and determines whether the obstacle A is disposed within the cleaning zone (S630).

When the existence of the obstacle A is checked through the image, a corresponding cleaning zone is divided into the obstacle surrounding zone including the obstacle A and a quadrangle zone (S640).

That is, as shown in FIG. 16B, the quadrangle zone B, B' may be an area that can be defined as the largest quadrangle among the areas excluding the obstacle A. In FIG. 16B, when the obstacle A is in a circular shape, the quadrangle zone may be a quadrangle formed to include a straight line in contact with the obstacle A in the cleaning area.

Therefore, as shown in FIG. 16B, two quadrangle sub cleaning zones above and below the obstacle A may be defined as quadrangle zone.

The obstacle surrounding zone A' may be defined as a frame surrounding the obstacle A as shown in FIG. 16C. When the obstacle A is circular, the obstacle surrounding zone A' may have a donut shape. In this case, the obstacle surrounding zone A' and the quadrangle zone B, B' may be partly overlapped with each other.

Next, as shown in FIG. 16D, the controller 140 performs the cleaning of the obstacle surrounding zone A' around the obstacle A by the cleaning method in the spiral mode (S650), and the quadrangle zone B, B' is cleaned by the cleaning method in the zigzag mode (S660).

In this way, if the cleaning zone is not defined in a certain form, the matching of the cleaning method is controlled according to the existence of the obstacle A by reading the image information to determine whether there is an obstacle A, thereby providing an optimal cleaning method according to the scenario.

When the cleaning of the cleaning zone is completed, the information related to the cleaning zone and the cleaning performing may be stored in the storage unit 150 and be utilized in the next cleaning process (S670).

FIG. 17 is a flowchart illustrating a control method of robot cleaner 100 according to another embodiment of the present disclosure.

First, as shown in FIG. 17, the controller 140 of the robot cleaner 100 performs the mapping performing step through the previous cleaning in the same manner as in the previous embodiments.

That is, the robot cleaner 100 performs the mapping performing step through the previous cleaning (S700).

When the mapping is completed, the shape of the cleaning zone is determined (S710). At this time, when there is an obstacle A inside the cleaning zone as shown in FIG. 16A, the controller 140 of the robot cleaner 100 cannot define the shape of the cleaning zone implemented by mapping through previous cleaning as a specific figure.

At this time, the controller 140 collects an image of the previous cleaning for the cleaning zone through the image detecting unit 135 (S720).

The controller 140 reads the mapped cleaning zone and the image information together and determines whether the obstacle A is disposed inside the cleaning zone (S730). When the existence of the obstacle A is checked through the image, a corresponding cleaning zone is divided into an obstacle surrounding zone including the obstacle A and a polygonal zone (S740).

That is, when the obstacle A exists as shown in FIG. 16B, the obstacle surrounding zone A' is defined in the shape of a frame surrounding the obstacle.

In addition, an area excluding the obstacle surrounding zone A' is a polygonal zone, and the controller 140 counts the number of inflection points of the outline of the polygonal zone (S750).

That is, when the number of inflection points is three, the shape of the polygonal zone is determined to be a triangle, the cleaning method of the edge type mode is matched as shown in FIG. 7, and the efficiency is determined, thereby performing the cleaning of the polygonal zone as an optimal cleaning method (S760).

Meanwhile, when the number of inflection points of the outline of the polygonal zone is larger than 3, the cleaning is performed in the edge mode as shown in FIG. 11. Further, when the remaining area is 40% or less of the total area, it is possible to match the hybrid cleaning method of cleaning in the spiral cleaning method.

In addition, as shown in FIG. 11, the efficiencies of the matched method and the basic mode may be calculated to clean a corresponding polygonal zone with a high efficiency cleaning method.

When the cleaning of the polygonal zone is performed, the cleaning of the obstacle surrounding zone A' is performed (S770).

That is, in the case of the obstacle surrounding zone A', the controller 140 may perform cleaning in the spiral mode around the obstacle A.

As described above, the cleaning is performed more precisely by matching the optimal cleaning mode according to the shape of the polygonal zone excluding the obstacle surrounding zone.

Thus, if the cleaning zone is not defined in a certain form, image information is read together to determine whether there is an obstacle to control the matching of the cleaning method according to the existence of the obstacle, so that an optimum cleaning method can be provided according to a scenario.

Meanwhile, if the shape of the cleaning zone is defined by performing the mapping after the previous cleaning, the cleaning may be performed by matching the traveling mode according to the above-described embodiment (S790).

When the cleaning of a corresponding cleaning zone is completed, the information on the cleaning zone and the cleaning performing may be stored in the storage unit 150 and be used in the next cleaning process (S780).

Meanwhile, if the obstacle is disposed in an area inside the cleaning zone and the shape of the space is deformed, the controller 140 may read this and divide the cleaning zone and match the cleaning method to perform the cleaning.

FIG. 18 is a flowchart illustrating a control method of robot cleaner according to another embodiment of the present disclosure, and FIGS. 19A to 19D are diagrams illustrating a space recognition state according to the control method of FIG. 18.

Referring to FIG. 18, the controller 140 of the robot cleaner 100 performs the mapping performing step through the previous cleaning in the same manner as in the previous embodiments (S800). At this time, the controller 140 collects the image of the previous cleaning for the cleaning zone through the image detecting unit 135 (S810).

The controller 140 combines the image information and the information of the cleaning zone according to the mapping together to determine whether there is a deformation of space shape due to the obstacle in the cleaning zone (S820).

That is, when the shape information of a corresponding cleaning zone previously stored in the storage unit 150 is read together, and the mapping by the previous cleaning is performed, it is determined whether there is a deformation of shape due to the obstacle.

If an obstacle exists in the cleaning zone as shown in FIG. 19A, mapping of the cleaning zone may be performed as shown in FIG. 19B through image information and previous cleaning, and the shape of the cleaning zone may be defined (S830).

At this time, only the polygonal zone that can be cleaned in the zigzag mode is extracted from the defined cleaning zone and the cleaning is performed in the zigzag mode (S840).

That is, a virtual line 1b parallel to the line 1a cut by the obstacle is calculated to allow a corresponding cleaning zone to be cleaned in the zigzag mode as shown in FIG. 19C, and the polygonal zone E formed by the parallel virtual line 1b is cleaned in the zigzag mode.

Meanwhile, the number of inflection points in the remaining area F, which is the rest area defined by the virtual line 1b, is counted (S850).

When the counted number of the inflection points is three, the shape of the remaining area is defined as a triangle, and the traveling mode is matched as described in FIG. 7 and the efficiency is calculated to perform cleaning in an optimal mode (S860). When the counted number of the inflection points is four or more and m or less, the shape of the remaining area is defined as a polygon, and the traveling mode is matched as described in FIG. 11 and the efficiency is calculated to perform cleaning in an optimal mode (S870). When the counted number of the inflection points is greater than n, the shape of the remaining area is defined as a circle, and the traveling mode is matched as described in FIG. 9 and the efficiency is calculated to perform cleaning in an optimal mode (S880). As described above, the controller 140 may perform an optimized cleaning process by matching the cleaning method set by each defined shape.

For example, in the case of the cleaning zone of FIG. 19D, it may be divided into the polygonal zone G that can be cleaned in the zigzag mode and the remaining area H, H', and the polygonal zone G may be cleaned in the zigzag mode and, when the shape of the remaining area H, H' is defined as a triangle, it is possible to perform cleaning in the edge type.

When the cleaning of a corresponding cleaning zone is completed, the information on the cleaning zone and the cleaning performing is stored in the storage unit 150 and may be utilized in the next cleaning process (S890).

EXPLANATION OF REFERENCE NUMERAL

100: Robot Cleaner 120: Sensing Unit
140: Controller 150: Storage Unit
160: Traveling Unit 135: Image Detecting Unit
180: Cleaning Unit 200: Charging Stand

The invention claimed is:

1. A robot cleaner comprising:
a traveling unit configured to move a main body;
a cleaning unit configured to perform a cleaning function;
a sensing unit configured to detect a surrounding environment; and
a controller configured to perform a previous cleaning, to map a cleaning zone based on information detected by the sensing unit, and to control to perform cleaning by matching different cleaning methods according to a shape of the mapped cleaning zone, and
wherein, when the mapped cleaning zone cannot be defined in a specific form, the controller receives image information of the previous cleaning from the sensing unit, checks whether there is an obstacle, and divides the cleaning zone into an obstacle surrounding zone and a polygonal zone,
wherein the controller performs a cleaning of the obstacle surrounding zone in a spiral mode, and performs a cleaning of the polygonal zone in a zigzag mode.

2. The robot cleaner of claim 1, wherein the controller collects information related to the cleaning zone while performing the previous cleaning in an edge mode or a zigzag mode.

3. The robot cleaner of claim 1, wherein the controller compares efficiencies of a cleaning method matched with the cleaning zone with a cleaning method in a basic mode, and performs a cleaning in a higher efficiency method.

4. The robot cleaner of claim 1, wherein the controller defines the shape of the cleaning zone according to a number of inflection points of an outline of the mapped cleaning zone.

5. The robot cleaner of claim 4, wherein the controller matches the cleaning method of an edge type mode when the number of inflection points of an outline of the mapped cleaning zone is three, matches the cleaning method of a spiral mode when the number of inflection points of the outline of the mapped cleaning zone is greater than n, and matches the cleaning method of a hybrid mode when the number of inflection points of the outline of the mapped cleaning zone is four or more, and is m or less.

6. The robot cleaner of claim 5, wherein, in the hybrid mode, the controller performs the cleaning method of the edge type mode, and then changes into the cleaning method of the spiral mode when remaining area is less than or equal to a certain range of a total area.

7. The robot cleaner of claim 6, wherein the controller changes the cleaning method, when the remaining area becomes 40% or less of the total area.

8. The robot cleaner of claim 1, wherein the controller divides the cleaning zone into a plurality of sub cleaning zones when an area of the mapped cleaning zone is greater than a first critical area, and performs cleaning by matching different cleaning methods according to the shape of each sub cleaning zone.

9. The robot cleaner of claim 8, wherein the controller generates a virtual line for space division at a vertex having an angle greater than or equal to a certain angle among vertices of the mapped cleaning zone.

10. The robot cleaner of claim 9, wherein the controller calculates an area of the plurality of sub cleaning zones, and matches the cleaning method according to a number of inflection points of an outline of the sub cleaning zone when the area of the sub cleaning zone is less than or equal to a second critical area.

11. The robot cleaner of claim 1, wherein the controller performs a cleaning of the obstacle surrounding zone in a spiral mode, and performs a cleaning of the polygonal zone in different cleaning methods according to a number of inflection points of an outline.

12. The robot cleaner of claim 11, wherein the controller defines the obstacle surrounding zone in a form of a frame surrounding the obstacle.

13. The robot cleaner of claim 12, wherein the controller defines the obstacle surrounding zone and the polygonal zone to be partly overlapped with each other.

14. The robot cleaner of claim 1, further comprising a storage unit that records previous cleaning information of the robot cleaner, and provides previous cleaning information for the cleaning zone to the controller to utilize when the controller performs the mapping of the cleaning zone.

15. The robot cleaner of claim 14, wherein the controller reads the previous cleaning information for the cleaning zone to compare with mapping information due to the previous cleaning, and determines whether there is an obstacle when there is a change in a shape of the cleaning zone.

16. The robot cleaner of claim 15, wherein, when it is determined that there is an obstacle, the controller newly determines a shape of the cleaning zone, and matches different cleaning methods according to the determined shape of the cleaning zone.

17. The robot cleaner of claim 16, wherein the controller extracts a polygonal zone that can be cleaned in a zigzag mode in the shape of the cleaning zone to perform cleaning in the zigzag mode, and matches different cleaning methods according to a shape of remaining area.

* * * * *